(12) United States Patent
Shitisawa et al.

(10) Patent No.: US 6,693,606 B1
(45) Date of Patent: Feb. 17, 2004

(54) METHOD OF AND APPARATUS FOR DISPLAYING MEASURED QUANTITY, RECORDING MEDIUM, AND PROGRAM

(75) Inventors: Takamasa Shitisawa, Tokyo (JP); Hajime Sugiyama, Tokyo (JP)

(73) Assignee: Sony Computer Entertainment Inc. (JP)

( * ) Notice: Subject to any disclaimer, the term of this patent is extended or adjusted under 35 U.S.C. 154(b) by 375 days.

(21) Appl. No.: 09/657,037

(22) Filed: Sep. 7, 2000

(30) Foreign Application Priority Data

Sep. 10, 1999 (JP) .......................... 11-257931
Sep. 16, 1999 (JP) .......................... 11-262754

(51) Int. Cl.$^7$ .............................. G09G 3/04; G09G 5/00
(52) U.S. Cl. .......................... 345/33; 345/848; 345/844
(58) Field of Search ............................... 345/30–33, 35, 345/38, 39–40, 844–852; 368/242, 239, 82

(56) References Cited

U.S. PATENT DOCUMENTS

| | | | | | |
|---|---|---|---|---|---|
| 3,460,127 | A | * | 8/1969 | Pahlavan | 345/33 |
| 3,772,874 | A | * | 11/1973 | Lefkowitz | 368/242 |
| 3,959,963 | A | * | 6/1976 | Murrell | 368/242 |
| 3,969,887 | A | * | 7/1976 | Fukumoto | 368/242 |
| 4,198,810 | A | * | 4/1980 | Fahrenschon | 368/239 |
| 4,400,092 | A | * | 8/1983 | Piquet et al. | 368/82 |
| 4,688,029 | A | * | 8/1987 | Kawasaki et al. | 345/40 |
| 4,874,253 | A | * | 10/1989 | Pompei et al. | 374/121 |
| 5,148,154 | A | * | 9/1992 | MacKay et al. | 345/782 |
| 5,303,388 | A | * | 4/1994 | Kreitman et al. | 345/836 |
| 5,369,416 | A | * | 11/1994 | Haverty et al. | 345/39 |
| 5,452,413 | A | * | 9/1995 | Blades | 345/786 |
| 5,491,779 | A | * | 2/1996 | Bezjian | 345/440 |
| 5,696,832 | A | * | 12/1997 | Sanders | 38/56 |
| 5,714,982 | A | | 2/1998 | Imai et al. | |
| 6,473,751 | B1 | * | 10/2002 | Nikolovska et al. | 707/3 |

FOREIGN PATENT DOCUMENTS

| | | |
|---|---|---|
| DE | 41 35 514 A1 | 2/1993 |
| DE | 295 04 124 U1 | 8/1995 |

* cited by examiner

Primary Examiner—Dennis-Doon Chow
Assistant Examiner—Alecia D. Nelson
(74) Attorney, Agent, or Firm—Lerner, David, Littenberg, Krumholz & Mentlik, LLP

(57) ABSTRACT

First and second block groups are arrayed and displayed around respective circles of smaller and larger diameters. A measured physical quantity is expressed by the positional relationship of blocks to be colored among blocks of the block groups and the amounts of coloring on the blocks to be colored.

38 Claims, 17 Drawing Sheets

METHOD OF AND APPARATUS FOR DISPLAYING MEASURED QUANTITY, RECORDING MEDIUM, AND PROGRAM

BACKGROUND OF THE INVENTION

1. Field of the Invention

The present invention relates to a method of and an apparatus for displaying a measured physical quantity including time information as the layout of a number of blocks or the coloring of a certain block, a recording medium which stores a program and data for performing such physical quantity display, and a program for performing such physical quantity display.

2. Description of Related Art

Apparatus for displaying measured physical quantities include an apparatus for digitally displaying a numerical value which represents a measured physical quantity and an apparatus for indicating a measured physical quantity with a pointer needle that moves in an analog fashion.

The apparatus for digitally displaying a numerical value is capable of accurately indicating a measured physical quantity. However, the digital representation fails to allow the user to observe the measured physical quantity intuitively, and is often regarded as lacking interest to the user because of the display of numerical values only.

The apparatus for indicating a measured physical quantity with a pointer needle is advantageous in that the user can have an intuitive recognition of the measured physical quantity. However, the user may occasionally lose track of the pointer needle in the absence of constant attention.

SUMMARY OF THE INVENTION

It is therefore an object of the present invention to provide a method of and an apparatus for displaying a measured physical quantity including time information, a recording medium, and a program which are capable of displaying a measured physical quantity with digital and analog display elements for enjoyable display patterns.

Another object of the present invention is to provide a method of and an apparatus for displaying a measured physical quantity including time information, a recording medium, and a program which allow the user to change parameter settings in an enjoyable manner for thereby making the user apt to be interested in computers.

According to an aspect of the present invention, a method of displaying a measured quantity comprises the step of expressing a measured physical quantity including time information with the positional relationship of at least one block to be colored in a plurality of blocks, and the amount of coloring on the block to be colored.

According to another aspect of the present invention, an apparatus for displaying a measured quantity, comprises measured quantity displaying means for expressing a measured physical quantity including time information with the positional relationship of at least one block to be colored in a plurality of blocks, and the amount of coloring on the block to be colored.

According to still another aspect of the present invention, a recording medium stores a program and data, the program comprising the step of expressing a measured physical quantity including time information with the positional relationship of at least one block to be colored in a plurality of blocks, and the amount of coloring on the block to be colored.

According to yet another aspect of the present invention, a program readable and executable by a computer comprises the step of expressing a measured physical quantity including time information with the positional relationship of at least one block to be colored in a plurality of blocks, and the amount of coloring on the block to be colored.

The positional relationship of the block serves as a digital display element, and the amount of coloring on the block as an analog display element.

Consequently, the method of and the apparatus for displaying a measured physical quantity including time information, the recording medium, and the program according to the present invention are capable of displaying a measured physical quantity with digital and analog display elements for enjoyable display patterns.

If a cluster of two or more blocks is defined as a single block group, then the two or more blocks of the block group may be arrayed and displayed according to a predetermined rule, the scale of the physical quantity including time information may be divided into two or more smaller scales, and the smaller scales may be assigned to the blocks, and the at least one block may be colored, so that the measured physical quantity can be expressed with the positional relationship of the block to be colored and the amount of coloring on the block to be colored. n (n=1, 2, 3, . . . ) block groups may be arrayed and displayed according to respective individual rules, so that the measured physical quantity can be expressed with the positional relationship of blocks to be colored in the block groups and the amounts of coloring on the blocks to be colored.

At least one block to be colored in the block group may be fixedly displayed, and remaining blocks of the block group may be movably displayed according to a predetermined rule. As a result, the display of a measured quantity, which has heretofore been liable to be boring to the user, is made enjoyable, and may be performed with many functions.

The block group may be rotated in an arbitrary direction about the block to be colored. Thus, the user is unlikely to lose track of the blocks to be colored. Accordingly, the measured quantity displaying functions can sufficiently be performed.

The physical quantity may represent the length of an object, the weight of an object, the speed of an object, the acceleration of an object, the magnitude of a measured current, the magnitude of a measured voltage, or a frequency. Alternatively, the physical quantity may represent calendar information or clock information.

If clock information is to be displayed, then two block groups may be arrayed and displayed around respective circles of different diameters, a smaller scale represented by a short hand may be assigned to one of the two block groups, a smaller scale represented by a long hand may be assigned to the other of the two block groups, the position of the short hand may be simulatively expressed with the positional relationship of the block to be colored in the one block group and the amount of coloring on the block, and the position of the long hand may be simulatively expressed with the positional relationship of the block to be colored in the other block group and the amount of coloring on the block.

Alternatively, clock information may be displayed by arraying and displaying a block group around a predetermined circle, expressing hours with the positional relationship of a block to be colored in the block group, and expressing minutes and seconds with the amount of coloring on the block to be colored.

According to a yet still another aspect of the present invention, a menu image for changing settings of parameters for use in a computer and a model image representing attributes of the parameters are simultaneously displayed, and the model image is changed based on the settings of the parameters which are changed in response to a control input.

When the user is to change settings of various parameters used by the computer, the user changes those parameter settings while viewing the displayed menu image. At this time, the model image displayed behind the menu image is changed based on the changed parameter settings.

Usually, it has heretofore been the general practice to display an unattractive setting image of only items and numbers. According to the present invention, however, the model image representing parameter attributes is displayed behind the menu image, for example, and the model image changes depending on parameter values. Therefore, the user finds it enjoyable to change parameter settings, and tends to be interested in the computer.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A method of and an apparatus for displaying a measured quantity, such as a measured physical quantity including time information, a recording medium which stores a program and data for performing such physical quantity display, and a program for performing such physical quantity display will be described below with reference to FIGS. 1 through 17.

According to the present invention, a measured quantity displaying process or function displays a measured physical quantity including time information with the positional relationship of at least one block to be colored, among a number of blocks, and the amount of coloring on the block to be colored.

Figure 1:
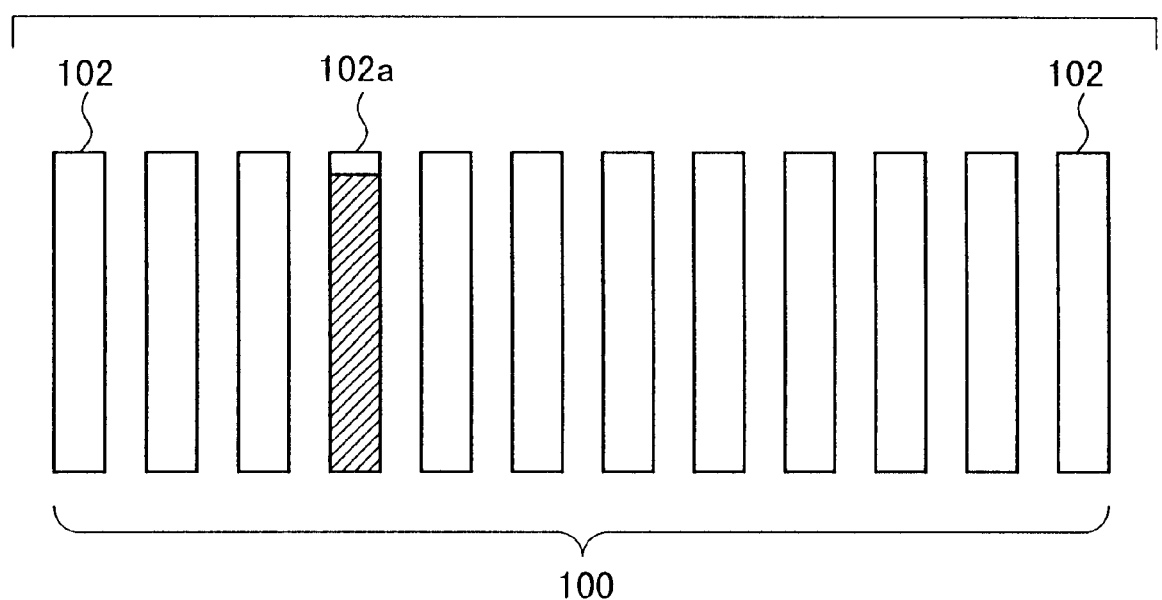
FIG. 1 is a view showing the display of a measured physical quantity according to a first embodiment of the present invention.

According to the basic principle of the measured quantity displaying function, as shown in FIG. 1, a cluster of two or more blocks 102 is defined as one block group 100, and the two or more blocks 102 of the block group 100 are arrayed and displayed according to a predetermined rule. The scale of a physical quantity including time information is divided into two or more smaller scales, which are assigned to the blocks 102, and at least one block 102a is colored. A measured physical quantity is represented by the positional relationship of the block 102a to be colored and the amount of coloring on the block 102a. The measured quantity displaying function shown in FIG. 1 is also referred to as a measured quantity displaying process according to a first embodiment of the present invention.

Figure 2:
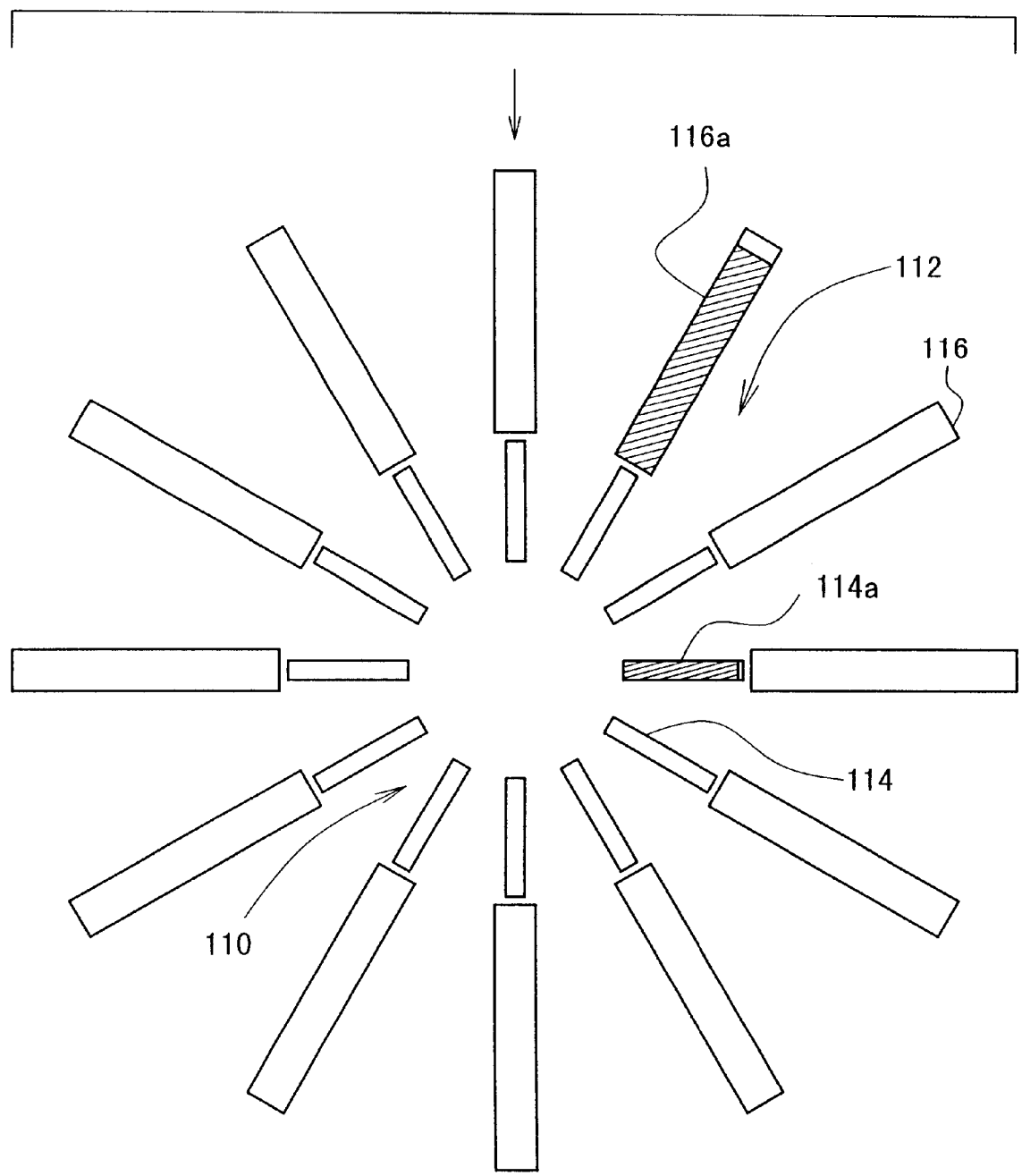
FIG. 2 is a view showing the display of a measured physical quantity according to a second embodiment of the present invention.

Alternatively, as shown in FIG. 2, n (n=1, 2, 3, . . . ) block groups 110, 112 are arrayed and displayed according to respective individual rules. In FIG. 2, n=2. A measured physical quantity is represented by the positional relationship of blocks 114a, 116a to be colored among blocks 114, 116 of the block groups 110, 112, and the amount of coloring on the blocks 114a, 116a. The measured quantity displaying function shown in FIG. 2 is also referred to as a measured quantity displaying process according to a second embodiment of the present invention.

Each of the blocks 102, 114, 116 of the block groups 100, 110, 112 is displayed as a transparent polygonal shape such as a quadrangular prism, a hexagonal prism, or the like.

A specific example of the measured quantity displaying process according to the first embodiment shown in FIG. 1 will be described below. The block group 100 comprises twelve blocks 102 arranged in a horizontal array and each having its longitudinal axis extending vertically.

In order for the user to know, at a glance, that the block 102a is a block to be colored, the block 102a is colored 100% when the smaller scale assigned thereto is of value of 0. This is because if the block 102a were colored 0% when the smaller scale assigned thereto is of value of 0, then the user would fail to recognize which one of the blocks 102 is selected.

As the value of the smaller scale assigned to the block 102a increases, the amount of coloring on the block 102a decreases. Therefore, the value of the smaller scale assigned to the block 102a and the amount of coloring on the block 102a are inversely proportional to each other, i.e., the block 102a exhibits a negative amount of coloring in terms of the relationship between the value of the smaller scale assigned to the block 102a and the amount of coloring on the block 102a.

If the physical quantity to be measured represents the length of an object, the weight of an object, the speed of an object, the acceleration of an object, the magnitude of a measured current, the magnitude of a measured voltage, or a frequency, then the smaller scale assigned to each block 102 may be defined as representing 10 cm, 10 g, 10 m/s, 10 m/s$^2$, 10A, 10V, or 10 MHz, for example.

In FIG. 1, the block 102a to be colored is the fourth block from the left end of the array, and is colored substantially 90%. Therefore, the colored block 102a represents a measured physical quantity of 41 cm, 41 g, 41 m/s, 41 m/s$^2$, 41A, 41V, or 41 MHz.

Stated otherwise, if the length of an object is 41 cm, then the fourth block 102a is selected as a block to be colored, and the selected block 102a is colored 90%.

If calendar information is employed as a physical quantity, then the blocks 102 represent months and the amount of coloring represents days. In the example shown in FIG. 1, if the leftmost block 102 represents January, then the colored block 102a represents about 3rd of April.

If clock information is employed as a physical quantity, then the blocks 102 represent hours and the amount of coloring represents minutes and seconds. In the example shown in FIG. 1, since the block group 100 has only twelve blocks 102, the blocks 102 may be colored in different colors if they are to display 24 hours.

For example, the blocks 102 may be colored in blue, for example, from 0 AM to noon, and red, for example, from noon to 12 PM. In the example shown in FIG. 1, if the leftmost block 102 represents 1 AM or 1 PM, then the colored block 102a represents about 04:06 when it is colored in blue, and about 16:06 when it is colored in red.

A specific example of the measured quantity displaying process according to the second embodiment shown in FIG. 2 will be described below.

The measured quantity displaying process according to the second embodiment differs from the measured quantity displaying process according to the first embodiment in that the block groups 110, 112 are arrayed and displayed according to respective individual rules. In the example shown in FIG. 2, the first block group 110 is made up of twelve narrower blocks 114 and arrayed around a smaller circle, and the second block group 112 is made up of twelve wider blocks 116 and arrayed around a larger circle, i.e., around the first block group 110. The blocks 114, 116 have their longitudinal axes oriented radially.

The two block groups 110, 112 may be, or may not be, related to each other in displaying measured physical quantities. If the two block groups 110, 112 are related to each other, then the inner first block group 110 may represent the integral part of a measured value, and the outer second block group 112 may represent the decimal part of the measured value, for example.

If the two block groups 110, 112 are not related to each other, then the inner first block group 110 may represent the length of an object, and the outer second block group 112 may represent the weight of the object, for example.

If time information is employed as a physical quantity, then the inner first block group 110 may represent clock information, and the outer second block group 112 may represent calendar information.

Specifically, in FIG. 2, if the blocks 116, 114 indicated by the arrow represent December and 12 AM or 12 PM, respectively, and the calendar and time proceed clockwise, then the colored blocks 116a, 114a represent 5th of January, about 03:05 when the first block group 110 is colored in blue, or 5th of January, about 15:05 when the first block group 110 is colored in red.

If clock information is employed as a physical quantity, then the inner first block group 110 may represent the short hand, and the outer second block group 112 may represent the long hand.

Specifically, the position of the block 114a to be colored in the first block group 110 represents hours, e.g. 1 AM or PM, and the amount of coloring on the block 114a represents minutes and seconds, e.g., 0 minute 0 second–59 minutes 59 seconds, within the hour. As described above, the amount of coloring is 100% at 0 minute 0 second, and decreases as the time (minutes, seconds) elapses. When the block 114a is colored in blue, it shows the elapse of time before noon, and when the block 114a is colored in red, it shows the elapse of time after noon.

The position of the block 116a to be colored in the second block group 112 represents the elapse of time in increments of 5 minutes, i.e., 5 minutes, 10 minutes, 15 minutes, . . . , and the amount of coloring on the block 116a represents the elapse of time, e.g., 0 minute 0 second–4 minutes 59 seconds within the 5 minutes. The amount of coloring is 100% at 0 minute 0 second, and decreases as the time (minutes, seconds) elapses.

Specifically, in FIG. 2, if the blocks 116, 114 indicated by the arrow represent 12 AM or 12 PM, and the time proceeds clockwise, then the colored blocks 116a, 114a represent about 03:06 when the first block group 110 is colored in blue, or about 15:06 when the first block group 110 is colored in red.

Therefore, the positional relationship of the block 114a to be colored and the amount of coloring thereon simulatively express the position of the short hand, and the positional relationship of the block 116a to be colored and the amount of coloring thereon simulatively express the position of the long hand.

Figure 3:
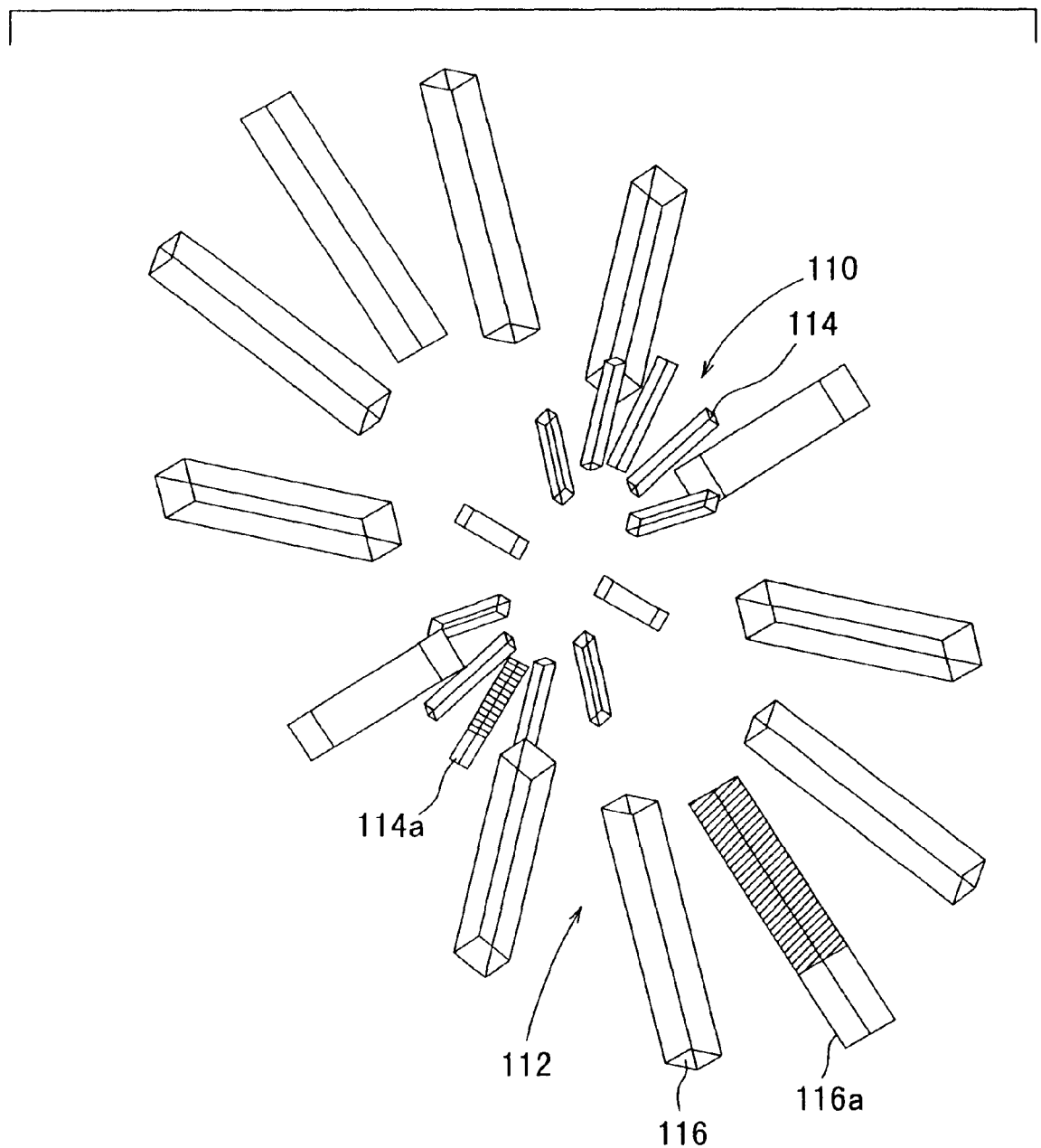
FIG. 3 is a view showing first and second groups of blocks that have been rotated.

Furthermore, the first and second block groups 110, 112 shown in FIG. 2 may be operated according to predetermined rules. For example, as shown in FIG. 3, the first block group 110 may be rotated clockwise, for example, about the longitudinal axis of the block 114a to be colored, and the second block group 112 may be rotated clockwise, for example, about the longitudinal axis of the block 116a to be colored. The first block group 110 may be rotated one revolution per 60 minutes, and the second block group 112 may be rotated one revolution per 60 seconds.

FIG. 3 shows the manner in which the first and second block groups 110, 112 are operated at about 07:26 when the first block group 110 is colored in blue, or about 19:26 when the first block group 110 is colored in red.

According to the above measured quantity displaying processes, as described above, a measured physical quantity including time information is represented by the positional relationship of at least one 102a, 114a, 116a of the blocks 102, 114, 116 of the block groups 100, 110, 112 and the amount of coloring on the blocks 102a, 114a, 116a. Consequently, the positional relationship of the blocks 102a, 114a, 116a serves as a digital display element, and the amount of coloring on the blocks 102a, 114a, 116a as an analog display element.

Therefore, the measured quantity displaying processes according to the present invention are capable of displaying a measured physical quantity with digital and analog display elements for enjoyable display patterns.

Of the blocks of the block groups 110, 112, at least the blocks 114a, 116a to be colored are fixedly displayed, and the remaining blocks 114, 116 are movably displayed according to predetermined rules. As a result, the display of a measured quantity, which has heretofore been liable to be boring to the user, is made enjoyable, and may be performed with many functions.

In the example shown in FIG. 3, the remaining blocks 114, 116 are rotated in an arbitrary direction about the fixed blocks 114a, 116a to be colored. Thus, the user is unlikely to lose track of the blocks 114a, 116a. Accordingly, the measured quantity displaying functions can sufficiently be performed.

An embodiment in which a method of and an apparatus for displaying a measured quantity are applied to an entertainment apparatus 10 for performing three-dimensional CG processing, and a recording medium and a program are applied to a recording medium storing a program and data executed by the entertainment apparatus 10 and such a program, will be described below with reference to FIGS. 4 through 10.

Figure 4:
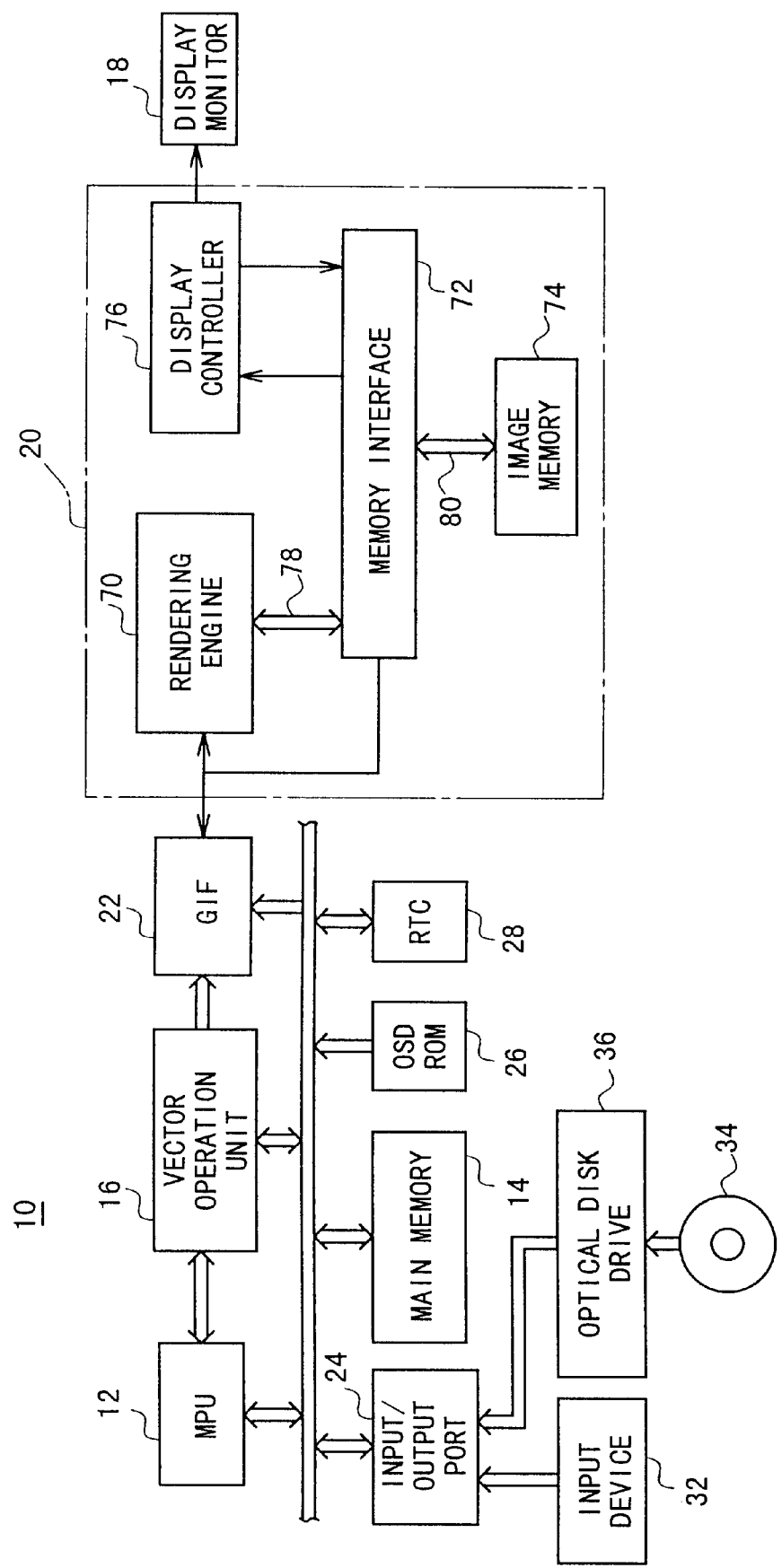
FIG. 4 is a block diagram of an arrangement of an entertainment apparatus according to the present invention.

As shown in FIG. 4, an entertainment apparatus 10 comprises an MPU 12 for controlling the entertainment apparatus 10, a main memory 14 for storing various programs to be run and various data, a vector operation unit 16 for performing floating-point vector operations required for geometry processing, an image processor 20 for generating image data under the control of the MPU 12 and outputting the generated image data to a display monitor 18, e.g., a CRT, a graphic interface (GIF) 22 for arbitrating transfer paths between the. MPU 12, the vector operation unit 16, and the image processor 20, an input/output port 24 for sending data to and receiving data from external devices, a ROM (OSDROM) 26 with an OSD function, which may comprise a flash memory or is the like, for controlling the kernel, etc., and a real-time clock (RTC) 28 having a calendar and clock function.

The main memory 14, the vector operation unit 16, the GIF 22, the OSDROM 26, the real-time clock 28, and the input/output port 24 are connected to the MPU 12 via a bus 30.

To the input/output port 24, there are connected an input device 32 for inputting data (key input data, coordinate data, etc.) to the entertainment apparatus 10, and an optical disk drive 36 for playing back an optical disk 34 such as a CD-ROM or the like in which various programs and data (object-related data, texture data, etc.) are stored.

As shown in FIG. 4, the image processor 20 comprises a rendering engine 70, a memory interface 72, an image memory 74, and a display controller 76 such as a programmable CRT controller or the like.

The rendering engine 70 serves to render and store image data in the image memory 74 via the memory interface 72 based on a rendering command supplied from the MPU 12.

A first bus 78 is connected between the memory interface 72 and the rendering engine 70, and a second bus 80 is connected between the memory interface 72 and the image memory 74. Each of the first and second buses 78, 80 has a 128-bit width, for example, for allowing the rendering engine 70 to render and store image data in the image memory 74 at a high speed.

The rendering engine 70 is capable of rendering image data of 320×240 pixels or image data of 640×480 pixels according to the NTSC or PAL system more than ten times to several ten times on a real-time fashion, i.e., in 1/60seconds to 1/30seconds.

The image memory 74 is of a unified memory structure that is able to designate a texture rendering area and a display rendering area as the same area.

The image controller 76 writes texture data read from the optical disk 34 via the optical disk drive 36 or texture data generated in the main memory 14 via the memory interface 72 into the texture rendering area of the image memory 74, and reads image data rendered in the display rendering area of the image memory 74 via the memory interface 72 and outputs the read image data to the display monitor 18 to display an image on its display screen.

An example of software, i.e., a measured quantity displaying means 200 (see FIG. 5), for performing the above measured quantity displaying processes, particularly the measured quantity displaying process according to the second embodiment shown in FIGS. 2 and 3, for displaying clock information will be described below with reference to FIGS. 5 through 7.

The measured quantity displaying means 200 is supplied to the entertainment apparatus 10 from a randomly accessible recording medium such as a CD-ROM or a memory card, or from the OSDROM 26, or via a network. It is assumed here that the measured quantity displaying means 200 is read into the main memory 14 from the OSDROM 26.

The measured quantity displaying means 200 is downloaded in advance from the OSDROM 26 in the entertainment apparatus 10 into the main memory 14 according to a predetermined process, and executed by the MPU 12.

Figure 5:
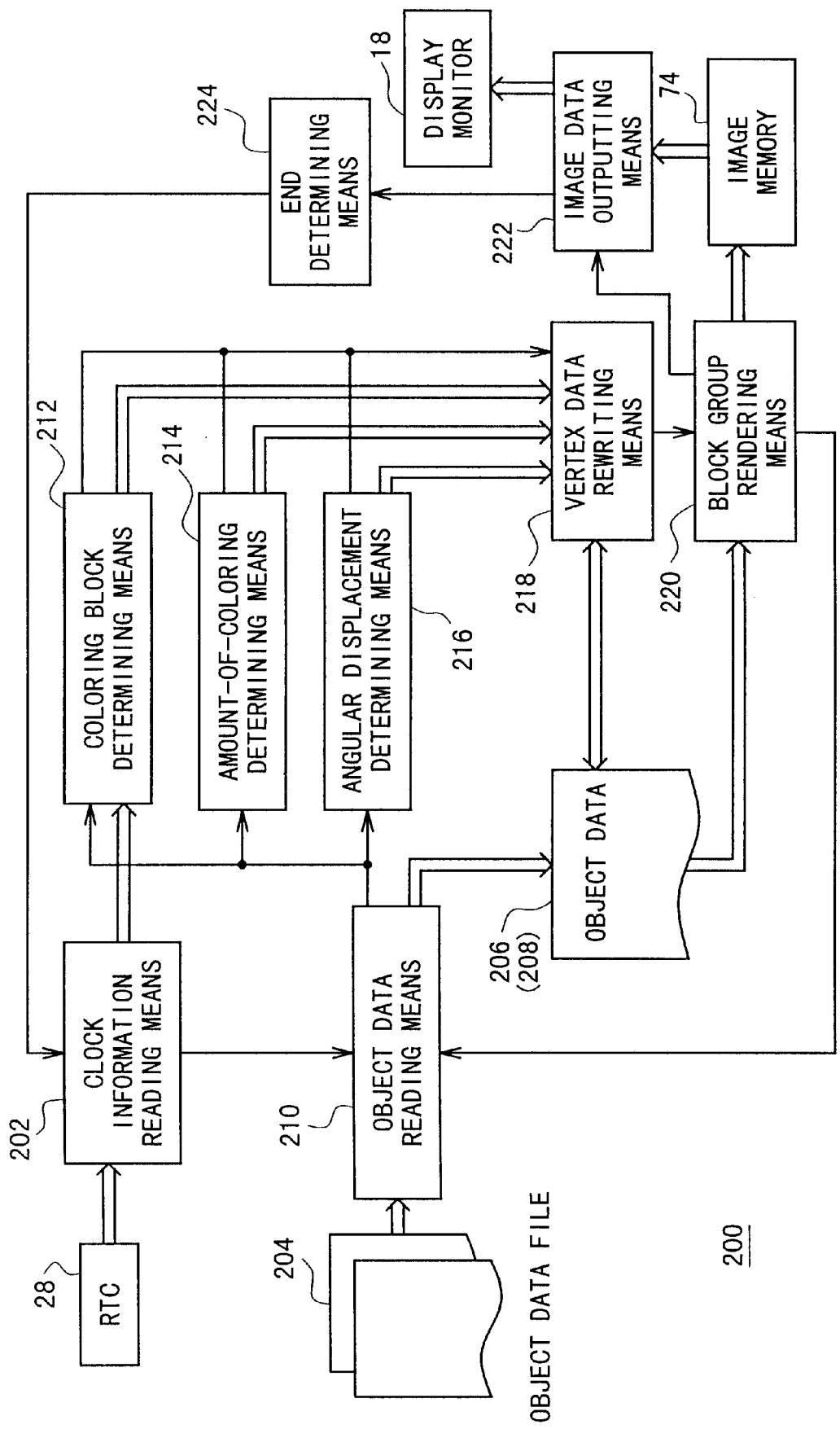
FIG. 5 is a functional block diagram of a measured quantity displaying means according to the present invention.

As shown in FIG. 5, the measured quantity displaying means 200 comprises a clock information reading means 202 for reading present clock information from the real-time clock 28, an object data reading means 210 for reading object data 206, 208 of the block groups 110, 112 from an object data file 204 stored in the OSDROM 26, a coloring block determining means 212 for determining the blocks 114a, 116b to be colored based on the clock information, an amount-of-coloring determining means 214 for determining amounts of coloring on the blocks 114a, 116a based on the clock information, and an angular displacement determining means 216 for determining angular displacements for the block groups 110, 112 based on the clock information.

The measured quantity displaying means 200 also comprises a vertex data rewriting means 218 for rewriting vertex data of the object data 206, 208 based on the information of the determined blocks 114a, 116a, and the information of the determined amounts of coloring and the determined angular displacements, a block group rendering means 220 for rendering three-dimensional images of the block groups 110, 112 by performing a refracting process, a bump mapping process, etc. based on at least vertex data registered in the object data 206, 208 and storing the rendered three-dimensional images in the image memory 74, an image data outputting means 222 for outputting the image data of the block groups 110, 112 stored in the image memory 74 to the display monitor 18 to display corresponding images thereon, and an end determining means 224 for determining whether the processing sequence of the measured quantity displaying means 200 is completed or not.

The processing sequence of the measured quantity displaying means 200 will be described below with reference to FIGS. 6 and 7.

Figure 6:
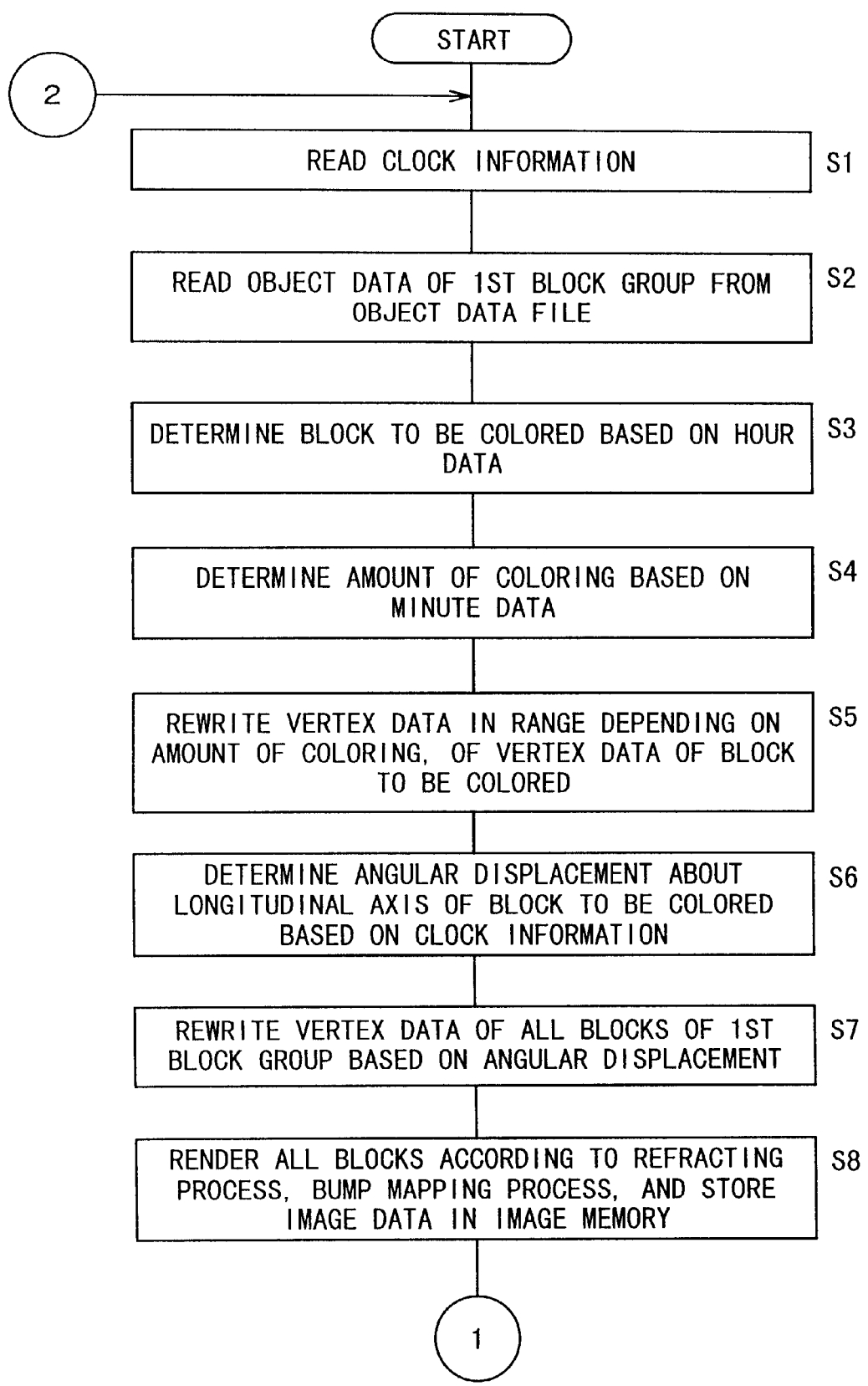
FIGS. 6 and 7 are a flowchart of a processing sequence of the measured quantity displaying means.

In step S1 shown in FIG. 6, the clock information reading means 202 reads present clock information from the real-time clock 28.

In step S2, the object data reading means 210 reads the object data 206 of the first block group 110 from the object data file 204.

In step S3, the coloring block determining means 212 determines a block 114a to be colored based on hour data of the clock information. Thereafter, in step S4, the amount of coloring determining means 214 determines an amount of coloring based on minute data of the clock information. In step S5, the vertex data rewriting means 218 rewrites vertex data (color-related information) in a range depending on the amount of coloring, of the vertex data of the block to be colored.

In step S6, the angular displacement determining means 216 determines an angular displacement about the longitudinal axis of the block 114a based on the clock information. In step S7, the vertex data rewriting means 218 rewrites all vertex data (coordinates-related information) of the first block group 110 based on the determined angular displacement.

In step S8, the block group rendering means 220 renders all the blocks 114 of the first block group 110 by performing a refracting process, a bump mapping process, etc., and stores three-dimensional image data of the first block group 110 in the image memory 74.

Figure 7:
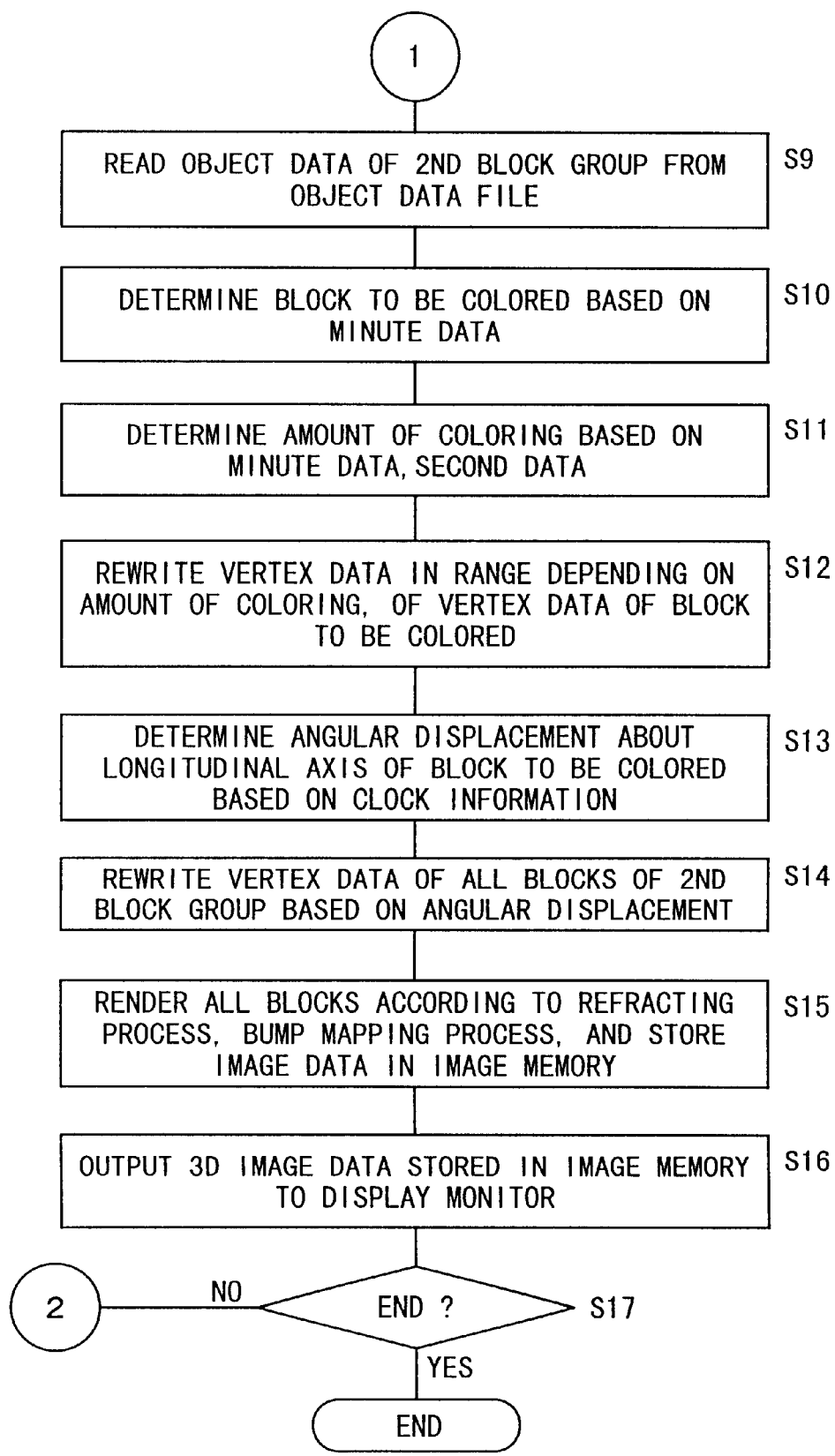

In step S9 shown in FIG. 7, the object data reading means 210 reads the object data 208 of the second block group 112 from the object data file 204.

In step S10, the coloring block determining means 212 determines a block 116a to be colored based on minute data of the clock information. Thereafter, in step S11, the amount of coloring determining means 214 determines an amount of coloring based on minute data and second data of the clock information. In step S12, the vertex data rewriting means 218 rewrites vertex data (color-related information) in a range depending on the amount of coloring, of the vertex data of the block to be colored.

In step S13, the angular displacement determining means 216 determines an angular displacement about the longitudinal axis of the block 116a based on the clock information. In step S14, the vertex data rewriting means 218 rewrites all vertex data (coordinates-related information) of the second block group 112 based on the determined angular displacement.

In step S15, the block group rendering means 220 renders all the blocks 116 of the second block group 112 by performing a refracting process, a bump mapping process, etc., and stores three-dimensional image data of the second block group 112 in the image memory 74.

In step S16, the image data outputting means 222 outputs the image data of the block groups 110, 112 stored in the image memory 74 to the display monitor 18, which displays three-dimensional images of the block groups 110, 112.

In step S17, the end determining means 224 decides whether there is an end request for finishing the processing sequence of the measured quantity displaying means 200 or not. If there is no end request, then the above processing sequence of the measured quantity displaying means 200 is repeated. If there is an end request, then the above processing sequence of the measured quantity displaying means 200 is ended.

As described above, when the entertainment apparatus 10 is energized without the optical disk 34 loaded therein, the measured quantity displaying means 200 can express clock information with the three-dimensional images of the first and second block groups 110, 112.

Of the blocks of the inner first block group 110, the single block 114a corresponding to the present time is displayed as an animation of colored light that progressively varies in the block 114a. Specifically, as time elapses, the displayed color light in the block 114a progressively decreases, just like an hourglass, toward the center of the circular pattern of the first block group 110.

The first block group 110 lies in one plane sharing the center of its circular pattern, and is rotated about an axis interconnecting the block 114a and the center. The first block group 110 makes one revolution per hour. When one hour has elapsed after the start of the rotation of the first block group 110, the coloring of the block 114a disappears and a next block 114a is colored, and the first block group 110 starts rotating about an axis interconnecting the newly colored block 114a and the center.

When the next block 114a is colored, the next block 114a is displayed as an animation of colored light that progressively varies in the block 114a.

Of the blocks of the outer second block group 112, the single block 116a corresponding to the present time (the information of every 5 minutes) is displayed as an animation of colored light that progressively varies in the block 114a. Specifically, as time elapses, the displayed color light in the block 116a progressively decreases, just like an hourglass, toward the center of the circular pattern of the second block group 112.

The second block group 112 lies in one plane sharing the center of its circular pattern, and is rotated about an axis interconnecting the block 116a and the center. The second block group 112 makes one revolution per 60 seconds. When 5 minutes have elapsed after the start of the rotation of the second block group 112, the coloring of the block 116a disappears and a next block 116a is colored, and the second block group 112 starts rotating about an axis interconnecting the newly colored block 116a and the center.

When the next block 116a is colored, the next block 116a is displayed as an animation of colored light that progressively varies in the block 116a.

The three-dimensional images of the first and second block groups 110, 112 as viewed by a fixed camera (viewpoint) are capable of expressing a certain time, e.g., a present time.

A parameter setting changing means 300 (see FIG. 11) according to the present invention will be described below with reference to FIGS. 8 through 17.

The parameter setting changing means 300 controls the 5 entertainment apparatus 10 to display a menu image on the display monitor 18, allowing the user to change various parameter settings by making settings at various items on the menu image.

Figure 8:
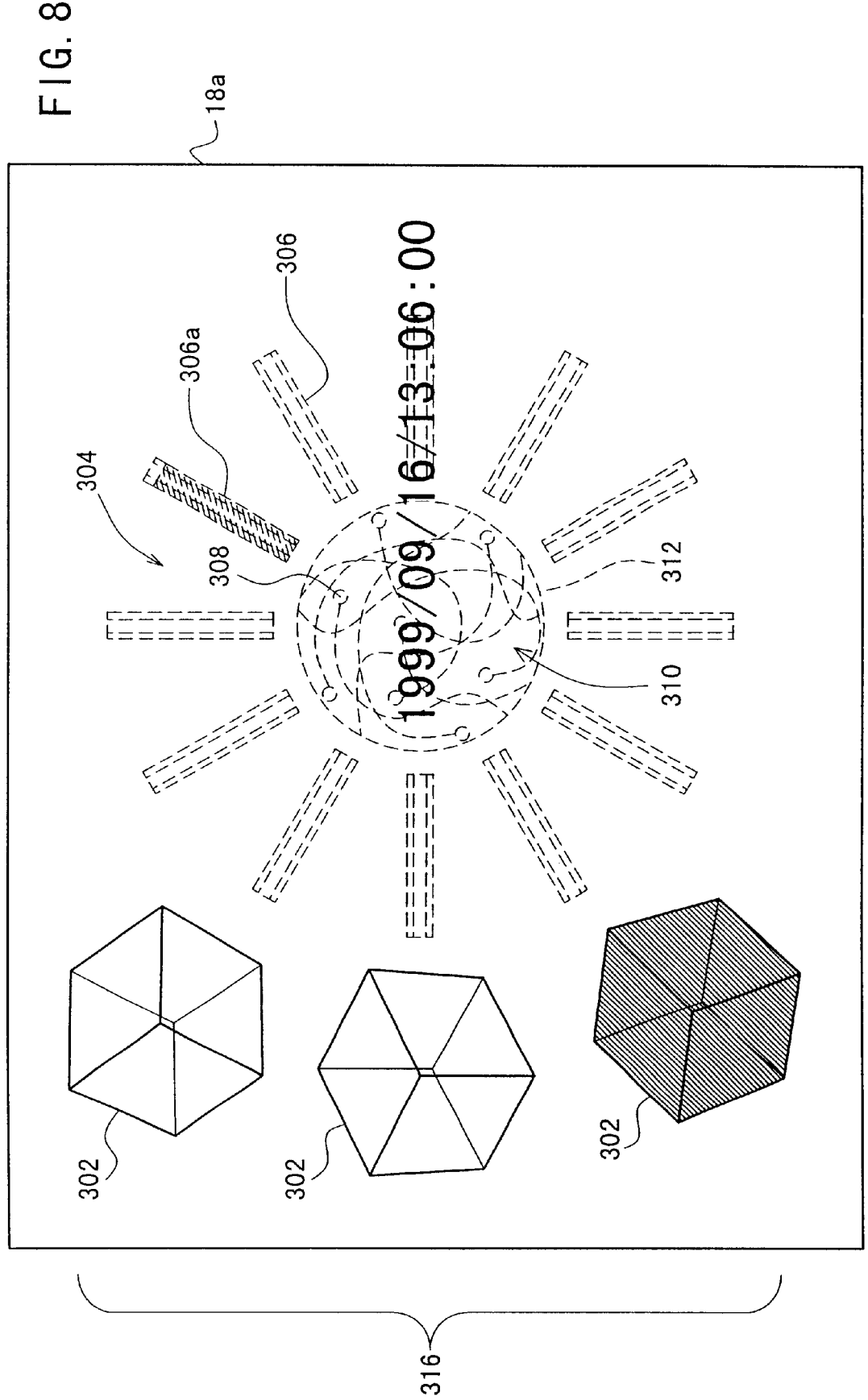
FIG. 8 is a view showing an image displayed by a parameter setting changing means according to the present invention.

Specifically, as shown in FIG. 8, the parameter setting changing means 300 displays as many cubes 302 as the number of items in the menu image on a display screen 18a of the display monitor 18, so that the user can select an item by selecting the corresponding cube and change a setting for the selected item. The cubes 302 are usually displayed as highly transparent cubes. When an item is selected, one of the cubes 302 which corresponds to the selected item is colored in blue, i.e., semitransparent blue. In FIG. 8, the third cube 302 is selected to display an item of year, month, day, and time.

Each of the cubes 302 rotates about an arbitrary axis of its own. The cube 302 corresponding to the selected item makes a different motion, such as a swinging motion or an abrupt motion, than the other cubes 302.

Figure 9:
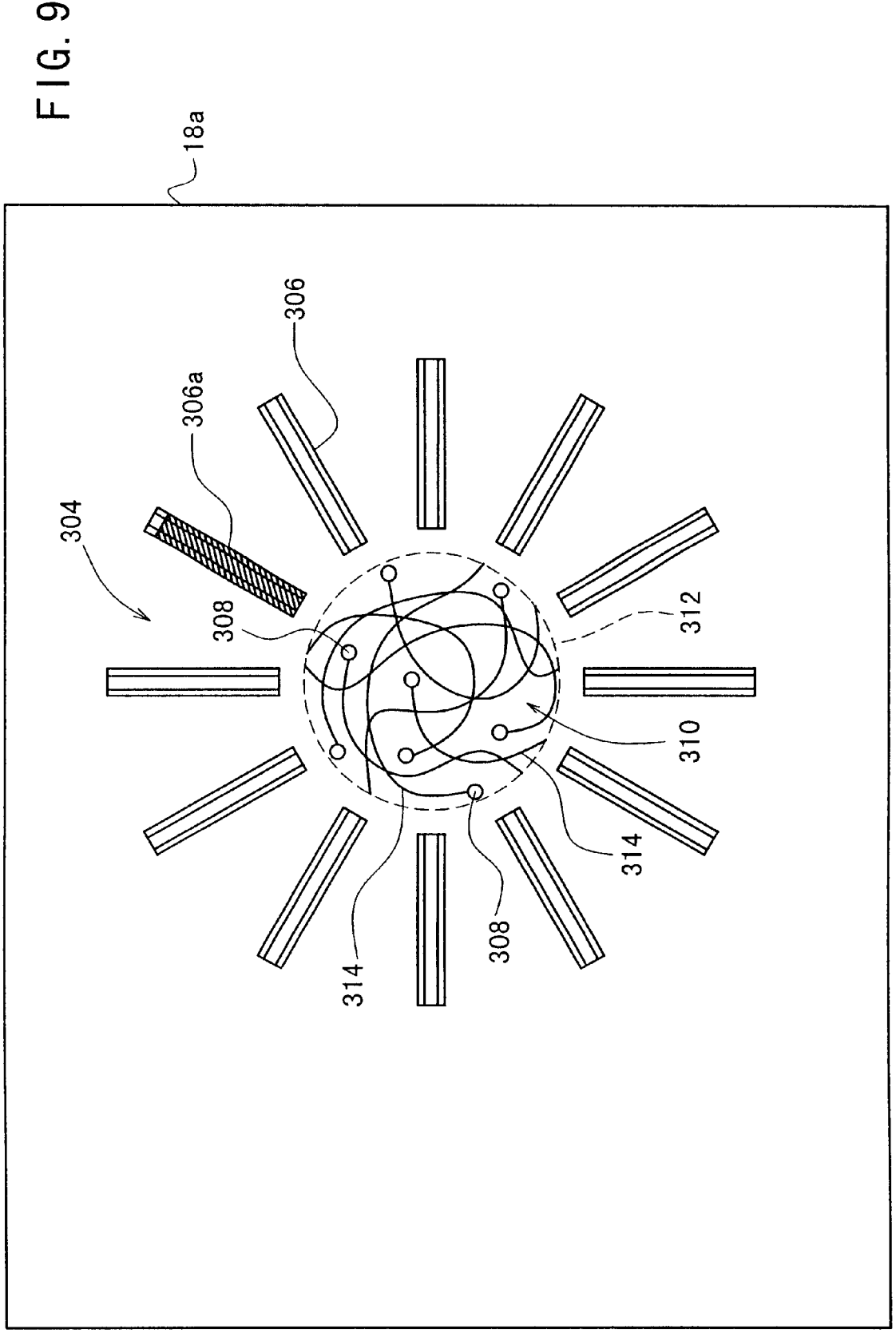
FIG. 9 is a view showing the displayed image with a displayed menu erased.
Figure 11:
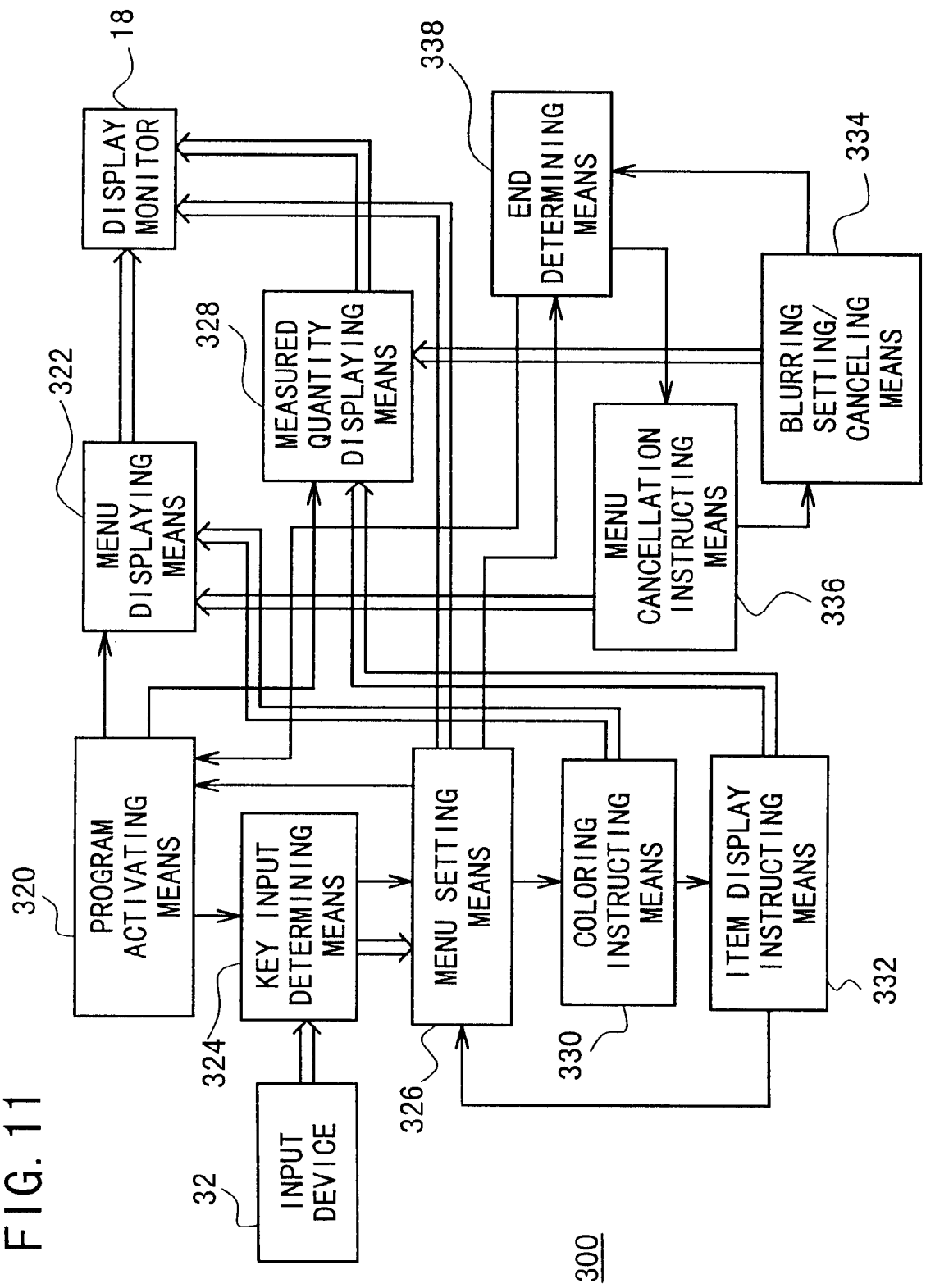
FIG. 11 is a functional block diagram of an arrangement of the parameter setting changing means.

As shown in FIG. 11, the parameter setting changing means 300 has a measured quantity displaying means 328 according to the second embodiment. For changing a time setting, as shown in FIG. 9, the measured quantity displaying means 328 displays a clock with a block group 304 of twelve hexagonal blocks 306, for example, arrayed around a given circle, and colors one 306a of the blocks 306 depending on the clock information. At this time, the block 306a to be colored represents hours, and the amount of coloring on the block 306a represents minutes and seconds. In the example shown in FIG. 9, the colored block 306a represents about 01:06 when the block group 304 is colored in blue, and about 13:06 when the block group 304 is colored in red.

Figure 10:
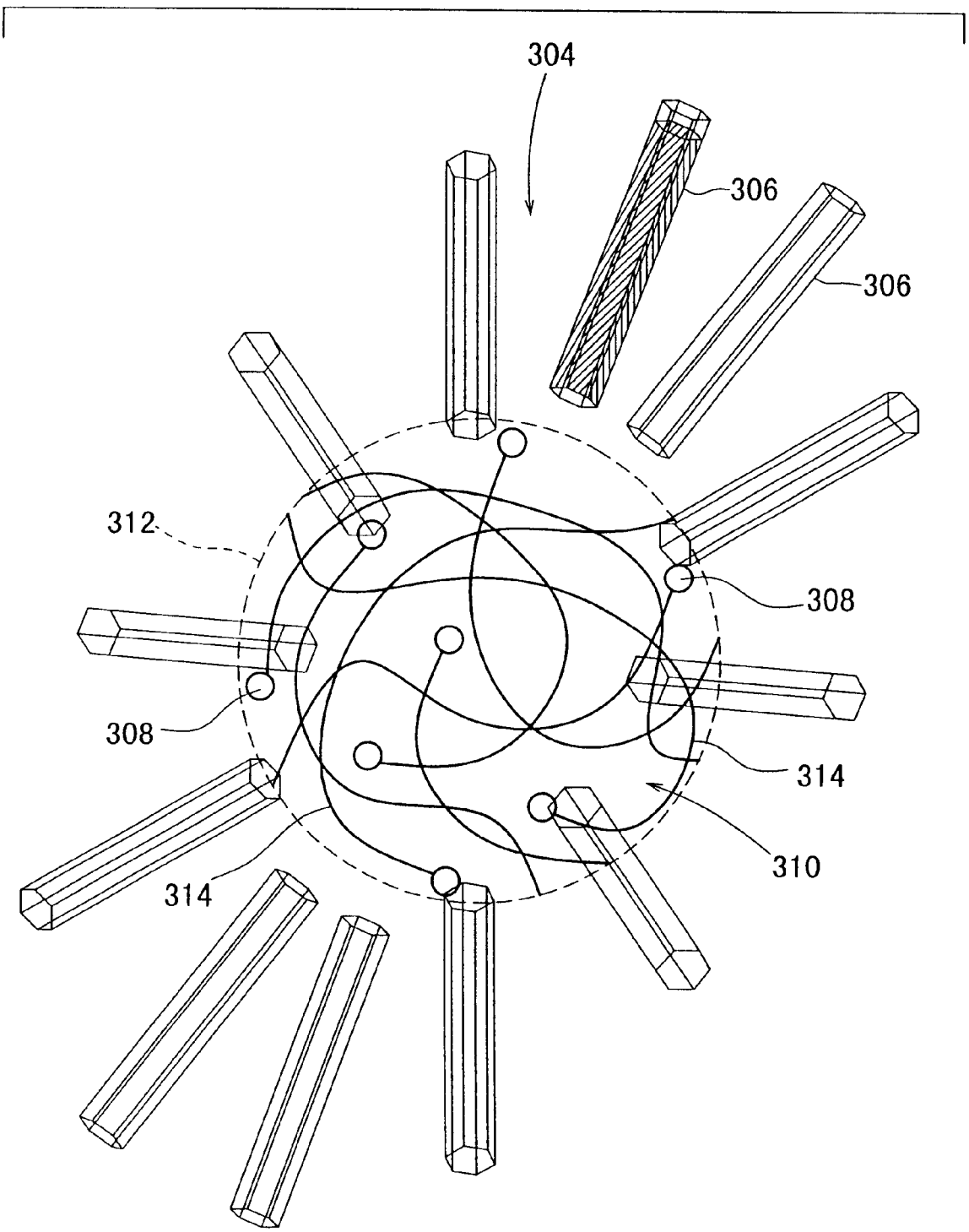
FIG. 10 is a view showing the displayed image with block groups rotated.

As shown in FIG. 10, the block group 304 is rotated clockwise, for example, about the longitudinal axis of the block 306*a*, and each of the blocks 306 is also rotated about the longitudinal axis of its own. The block group 304 makes one revolution per 60 seconds, and each of the blocks 306 makes one revolution per 15 seconds.

Radially inwardly of the block group 304, there is displayed a light spot group 310 of light spots 308 moving randomly around a single simulative sphere 312, indicated by the broken line. Each of the light spots 308 moves in a cyclic pattern in the period of several tens of seconds, and tracks 314 of these light spots 308 are also displayed by after-image processing. The displayed tracks 314 allow the user to visually perceive the simulative sphere 312, so that the user can view the light spots 308 as if they rotate randomly around the sphere 312. The motion of each of the light spots 308 varies from time zone to time zone.

The sphere 312 that emerges to view due to the moving light spots 308 and their tracks 314 periodically shrinks in a constant period.

As shown in FIG. 8, the parameter setting changing means 300 simultaneously displays the menu image with a cube group 316 and the time with the block group 304 and the light spot 308. The menu image is displayed in a front position and sharply focused, whereas the time is displayed in a rear position and out of focus, i.e., blurred, behind the menu image.

When the user changes the time setting using the menu image while the block group 304 has been rotating at a constant period, the block group 304 displayed in the rear position starts rotating abruptly quickly in synchronism with the changed time setting.

When the menu image is canceled, the block 306*a* to be colored is displayed in focus, displaying the time in the front position with the block group 304 and the light spots 308.

Other items than the item for changing time settings include an item for setting a playback track for CD-ROMs and DVD-ROMs, and an item for setting an access block of a memory card. In FIG. 8, three cubes 302 are displayed by way of example. However, the number of cubes 302 that are displayed change as the number of menu items in the menu image changes.

The parameter setting changing means 300 is supplied to the entertainment apparatus 10 from a randomly accessible recording medium such as a CD-ROM or a memory card, or from the OSDROM 26, or via a network. It is assumed here that the parameter setting changing means 300 is downloaded in advance from the OSDROM 26 in the entertainment apparatus 10 into the main memory 14 according to a predetermined process, and executed by the MPU 12.

As shown in FIG. 11, the parameter setting changing means 300 comprises a program activating means 320 for activating various programs, a menu displaying means 322 activatable by the program activating means 320 for displaying the menu image as shown in FIG. 8 on the display monitor 18, a key input determining means 324 for deciding whether there is a key input from the input device 32 or not, a menu setting means 326 for selecting a menu item and setting necessary parameters depending on a control input, and a measured quantity displaying means 328 according to the second embodiment for displaying the time as shown in FIGS. 8 and 9 on the display monitor 18.

The parameter setting changing means 300 also comprises a coloring instructing means 330 for instructing the menu displaying means 322 to perform the coloring on the cubes 302, an item display instructing means 332 for instructing the menu displaying means 322 to display item contents, a blurring setting/canceling means 334 for indicating whether an image to be displayed by the measured quantity displaying means 328 is to be blurred or not, a menu cancellation instructing means 336 for instructing the menu displaying means 322 to cancel the menu image, and an end determining means 338 for determining whether the processing sequence of the parameter setting changing means 300 is completed or not.

The menu displaying means 322 and the measured quantity displaying means 328 are activated by the program activating means 320 operate in a multitasking fashion under the management by the parameter setting changing means 300.

Figure 12:
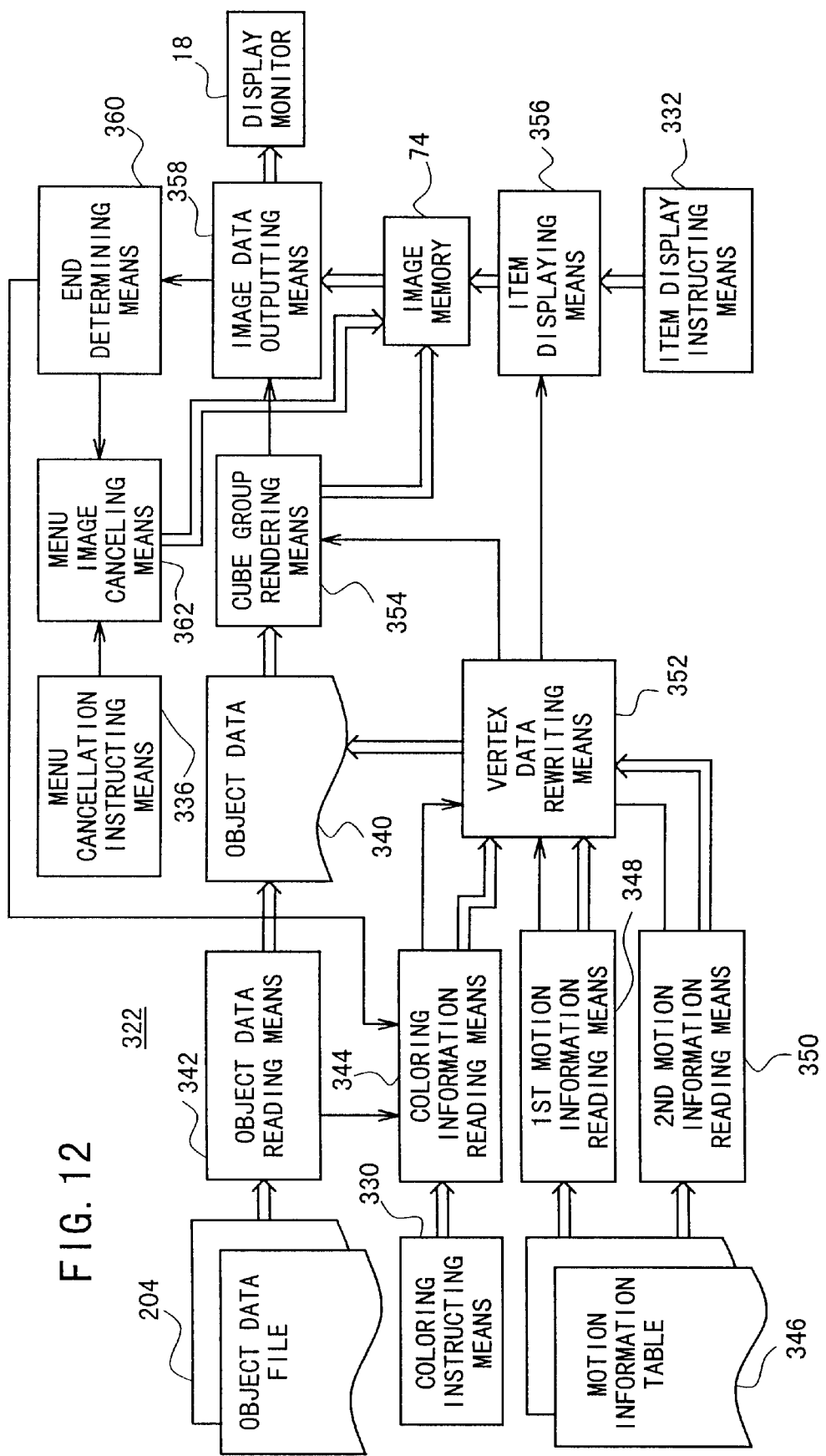
FIG. 12 is a functional block diagram of an arrangement of a menu displaying means.

As shown in FIG. 12, the menu displaying means 322 comprises an object data reading means 342 for reading necessary object data 340 of the cube group 316 from the object data file 204 stored in the OSDROM 26, a coloring information reading means 344 for reading information of a cube 302 to be colored, a first motion information reading means 348 for reading motion information about rotation of each cube 302 about its own axis from an motion information table 346 which stores motion information of the cubes 302, and a second motion information reading means 350 for reading motion information that is used to impart a special motion to the cube 302 to be colored.

The menu displaying means 322 also comprises a vertex data rewriting means 352 for rewriting vertex data of the object data 340 based on the information of the cube 302 to be colored and the motion information of the cubes 203, a cube group rendering means 354 for rendering three-dimensional images of the cube group 316 by performing a refracting process, a bump mapping process, etc. based on at least vertex data registered in the object data 340 and storing the rendered three-dimensional images in the image memory 74, an item displaying means 356 for writing item contents corresponding to a selected item in the image memory 74, an image data outputting means 358 for outputting the image data of the cube group 316 and the item contents stored in the image memory 74 to the display monitor 18 to display corresponding images thereon, an end determining means 360 for deciding whether the processing sequence of the menu displaying means 322 is completed or not, and a menu image canceling means 362 for canceling the displayed menu image.

Figure 13:
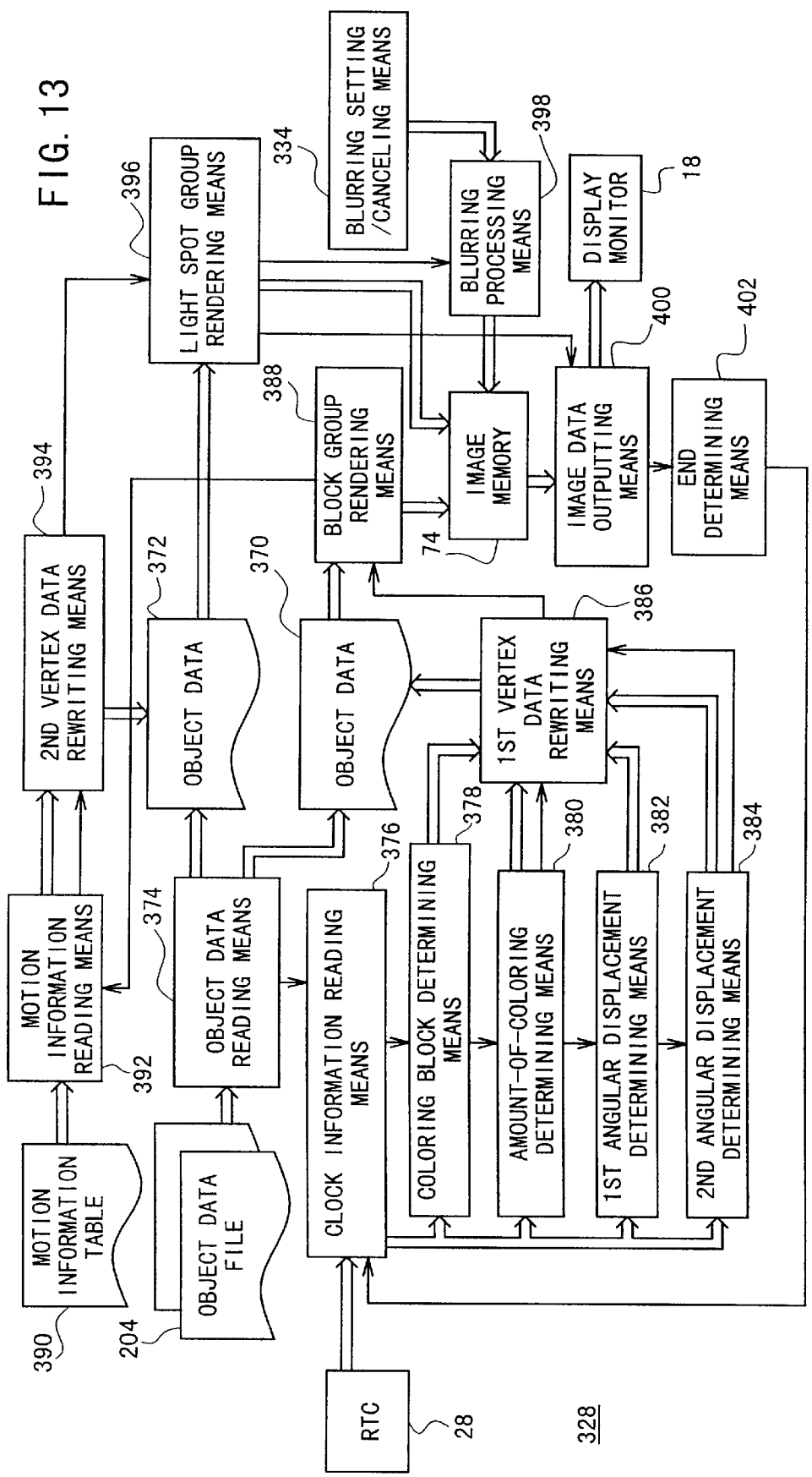
FIG. 13 is a functional block diagram of a measured quantity displaying means according to the second embodiment of the present invention.

As shown in FIG. 13, the measured quantity displaying means 328 according to the second embodiment comprises an object data reading means 374 for reading necessary object data 370, 372 of the block group 304 and the light spot group 310 from the object data file 204 stored in the OSDROM 26, a clock information reading means 376 for reading present clock information from the real-time clock 28, a coloring block determining means 378 for determining a block 306*a* to be colored based on the clock information, and an amount-of-coloring determining means 380 for determining an amount of coloring based on the clock information.

The measured quantity displaying means 328 also comprises a first angular displacement determining means 382 for determining an angular displacement for the block group 304 based on the clock information, a second angular displacement determining means 384 for determining an angular displacement for each block 306 to be rotated about its own axis, a first vertex data rewriting means 386 for rewriting vertex data of the object data 370 based on the information of the determined block 306a to be colored and the amount of coloring and the angular displacement which are also determined, and a block group rendering means 388 for rendering three-dimensional images of the block group 304 by performing a refracting process, a bump mapping process, etc. based on at least vertex data registered in the object data 370 and storing the rendered three-dimensional images in the image memory 74.

The measured quantity displaying means 328 also comprises an motion information reading means 392 for reading motion information of each light spot 308 from an motion information table 390 which stores motion information of each light spot 308, a second vertex data rewriting means 394 for rewriting vertex data of the object data 372 based on the motion information of each light spot 308, a light spot group rendering means 396 for rendering three-dimensional images of the light spots 308 and the tracks 314 according to the after-image processing based on at least the vertex data registered in the object data 372 and stores the rendered three-dimensional images in the image memory 74, a blurring processing means 398 for performing a blurring process on the rendered image data of the block group 304 and the light spot group 310 according to a pixel displacing process, a semitransparency process, etc. if the block and the light spots are to be blurred in display, an image data outputting means 400 for outputting the image data of at least the block group 304 and the light spot group 310 stored in the image memory 74 to the display monitor 18 to display corresponding images thereon, an end determining means 402 for determining whether the processing sequence of the measured quantity displaying means 328 is completed or not.

The processing sequence of the parameter setting changing means 300 will be described below with reference to FIGS. 14 through 17.

Figure 14:
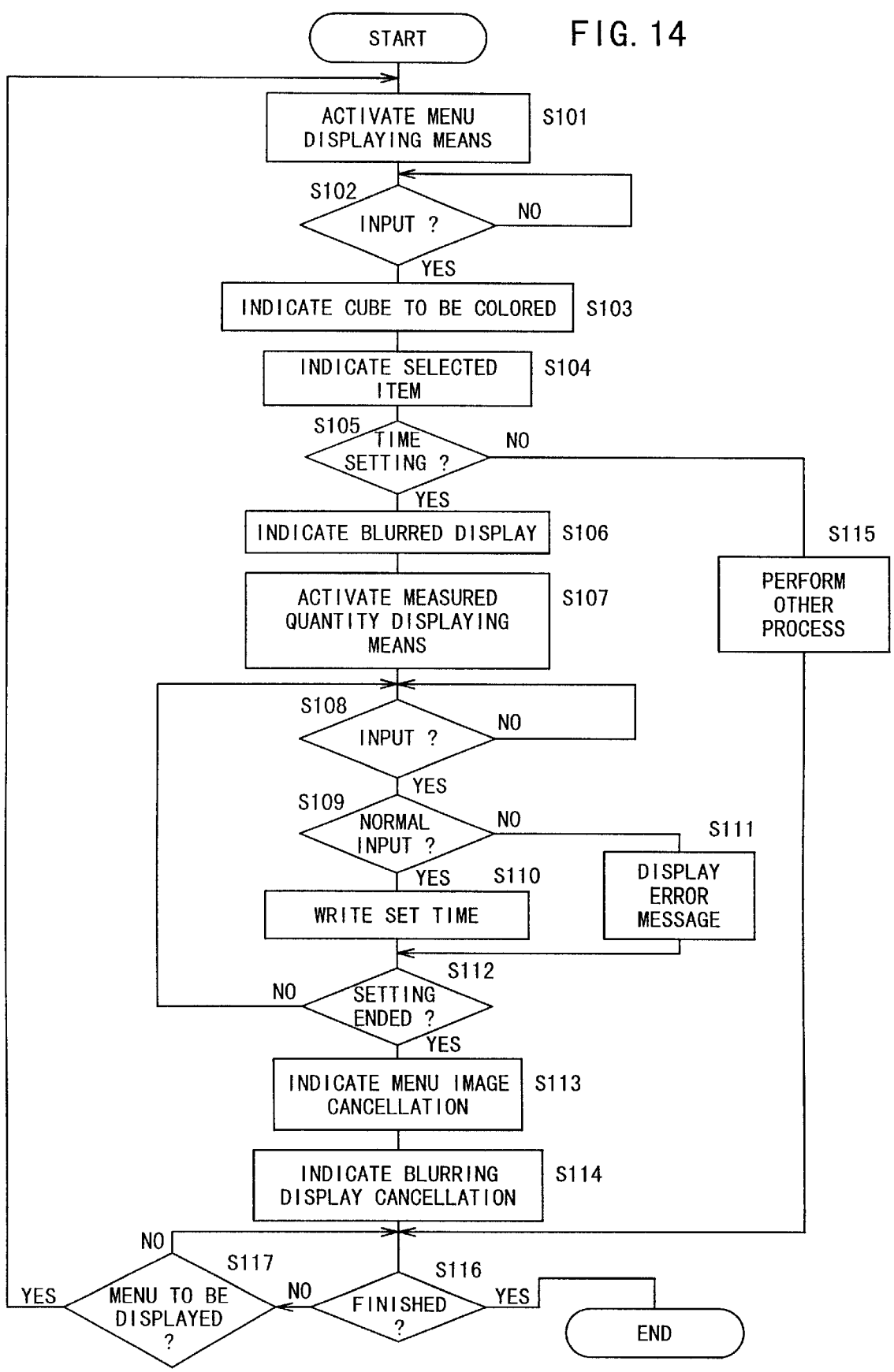
FIG. 14 is a flowchart of a processing sequence of the parameter setting changing means.

In step S101 shown in FIG. 14, the program activating means 320 activates the mean displaying means 322. The is processing sequence of the menu displaying means 322 will be described in detail later on.

In step S102, the key input determining means 324 decides whether there is a key input, i.e., a control input, from the input device 32 or not. If there is a control input from the input device 32, control goes to step S103 in which the coloring instructing means 330 indicates, to the menu displaying means 322, a cube 302 to be colored which corresponds to an item selected by the present control input.

In step S104, the item display instructing means 332 indicates, to the menu displaying means 322, the item selected by the present control input.

In step S105, the key input determining means 324 decides whether the item selected by the present control input represents a time setting or not. If the item selected by the present control input represents a time setting, then control goes to step S106 in which the blurring setting/canceling means 334 indicates a blurring setting to the measured quantity displaying means 328.

In step S107, the program activating means 320 activates the measured quantity displaying means 328. The processing sequence of the measured quantity displaying means 328 will be described in detail later on.

In step S108, the key input determining means 324 decides whether there is a control input from the input device 32 or not. If there is a control input from the input device 32, control goes to step S109 in which the menu setting means 326 decides whether the present control input represents a time setting (normal input) or not.

If the present control input is a normal input, then control proceeds to step S110 in which the menu setting means 326 rewrites the clock information of the real-time clock 28 with the presently inputted time. If the present control input is not a normal input, then control goes to step S111 in which the menu setting means 326 outputs an error message to the display monitor 18 to display the error message thereon.

After the processing in step S110 or the processing in step S111, control goes to step S112 in which the menu setting means 326 decides whether the present time setting is finished or not based on whether there is a control input from a predetermined button on the input device 32 or not.

If the present time setting is not finished, then control goes back to step S108 to repeat the processing from the step S108. If the present time setting is finished, then control goes to step S113 in which the menu cancellation instructing means 336 instructs the menu displaying means 322 to cancel the menu image.

In step S114, the blurring setting/canceling means 334 instructs the measured quantity displaying means 328 to cancel the blurring of a displayed image.

If the item selected by the present control input is not a time setting in step S105, then control goes to step S115 in which the parameter setting changing means 300 performs a process depending on the presently selected item.

After the processing in step S114 or the processing in step S115, control goes to step S116 in which the end determining means 338 decides whether there is an end request to finish the processing by the parameter setting changing means 300 or not.

If there is no end request, then the end determining means 338 decides whether there is a menu display request or not in step S117. If there is a menu display request, then control goes back to step S101 to repeat the processing from step S101. If there is no menu display request, then control goes back to step S116 to decide whether there is an end request to finish the processing by the parameter setting changing means 300 or not.

If there is an end request to finish the processing by the parameter setting changing means 300 in step S116, then the processing sequence of the parameter setting changing means 300 is ended.

The processing sequence of the menu displaying means 322 will be described below with reference to FIGS. 12 and 15.

Figure 15:
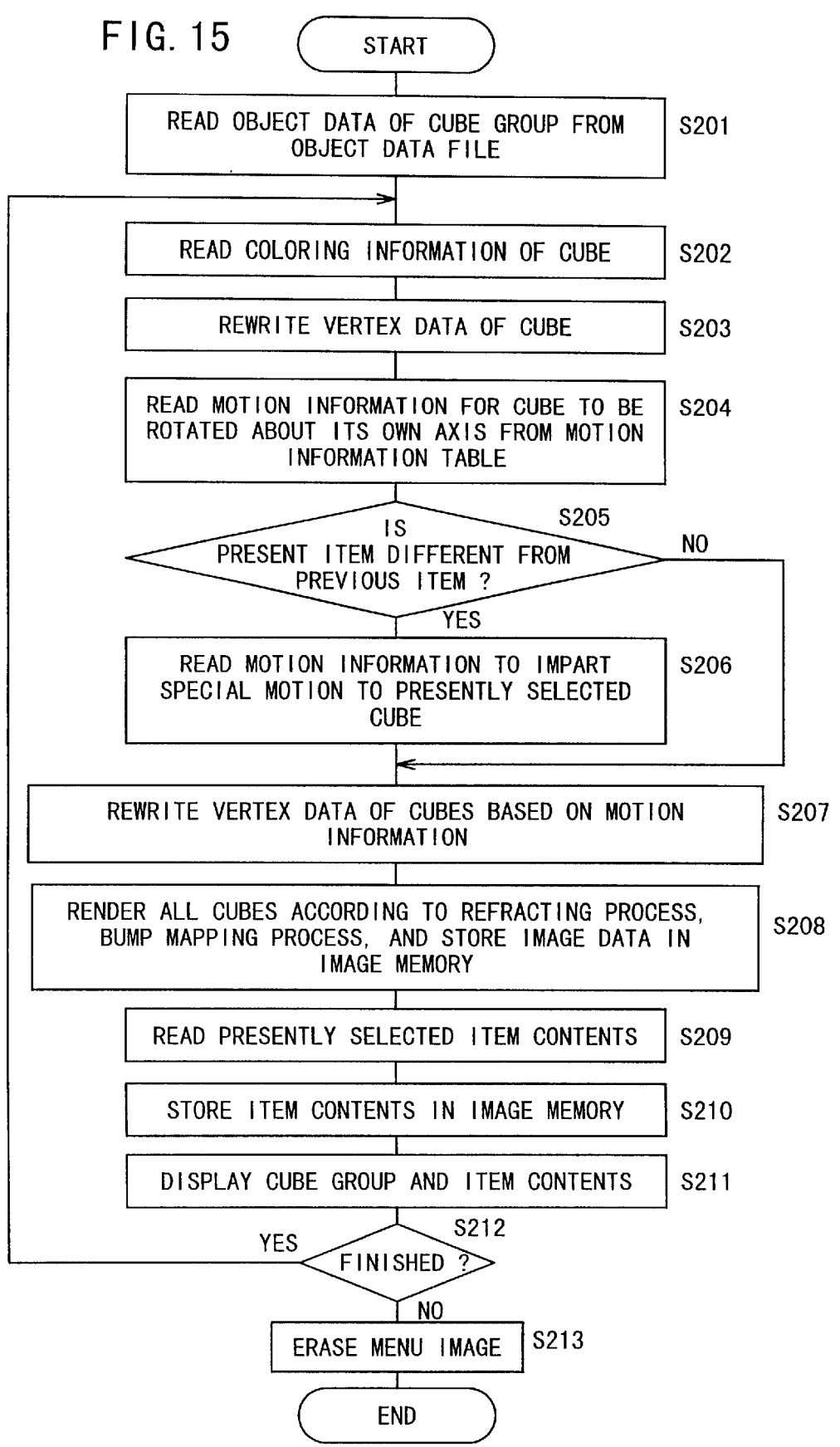
FIG. 15 is a flowchart of a processing sequence of the menu displaying means.

In step S201 shown in FIG. 15, the object data reading means 342 reads object data 340 of the cube group 316 from the object data file 204.

In step S202, the coloring information reading means 344 reads coloring information based on an instruction from the coloring instructing means 330 in the parameter setting changing means 300. The coloring information includes information of a cube 302 to be colored and information of a color, e.g., blue. In step S203, the vertex data rewriting means 352 rewrites vertex data relative to the color, of the vertex data of the cube 302 to be colored.

In step S204, the first motion information reading means 348 reads motion information about rotation of each cube 302 about its own axis from the motion information table 346.

In step S205, the second motion information reading means 350 decides whether the presently selected item is different from the previously selected item or not. If the presently selected item is different from the previously selected item, then control goes to step S206 in which the second motion information reading means 350 reads motion information that is used to impart a special motion to the cube 302 to be colored.

In step S207, the vertex data rewriting means 352 rewrites vertex data (coordinate-related information) of the object data 340 based on the motion information of the cube 302 to be colored and the motion information of the other cubes 302.

In step S208, the cube group rendering means 354 renders three-dimensional images of all the cubes 302 by performing a refracting process, a bump mapping process, etc. and stores the rendered three-dimensional images of the cube group 316 in the image memory 74.

In step S209, based on the information of an item (presently selected item) from the item display instructing means 332, the item displaying means 356 reads display data representing the contents of the item. Then, in step S210, the item displaying means 356 stores the item contents (display data) corresponding to the presently selected item into the Image memory 74.

In step S211, the image data outputting means 358 outputs the image data and the item contents of the cube group 316 stored in the image memory 74 to the display monitor 18, which displays three-dimensional images of the cube group 316 and the item contents corresponding to the presently selected item. At this time, only the cube 302 corresponding to the presently selected item is displayed in blue, i.e., semitransparent blue.

In step S212, the end determining means 360 decides whether there is an end request to cancel the displayed menu image or not based on an instruction from the menu cancellation instructing means 336. If there is no end request, control goes back to step S202 to repeat the processing from the step S202. If there is end request, then control goes to step S213 in which the menu image canceling means 362 erases all image data relative to the displayed menu image from the image memory 74. Therefore, the displayed menu image is erased from the display monitor 18.

After the processing in step S213, the processing sequence of the menu displaying means 322 comes to an end.

The processing sequence of the measured quantity displaying means 328 will be described below with reference to FIGS. 13, 16, and 17.

Figure 16:
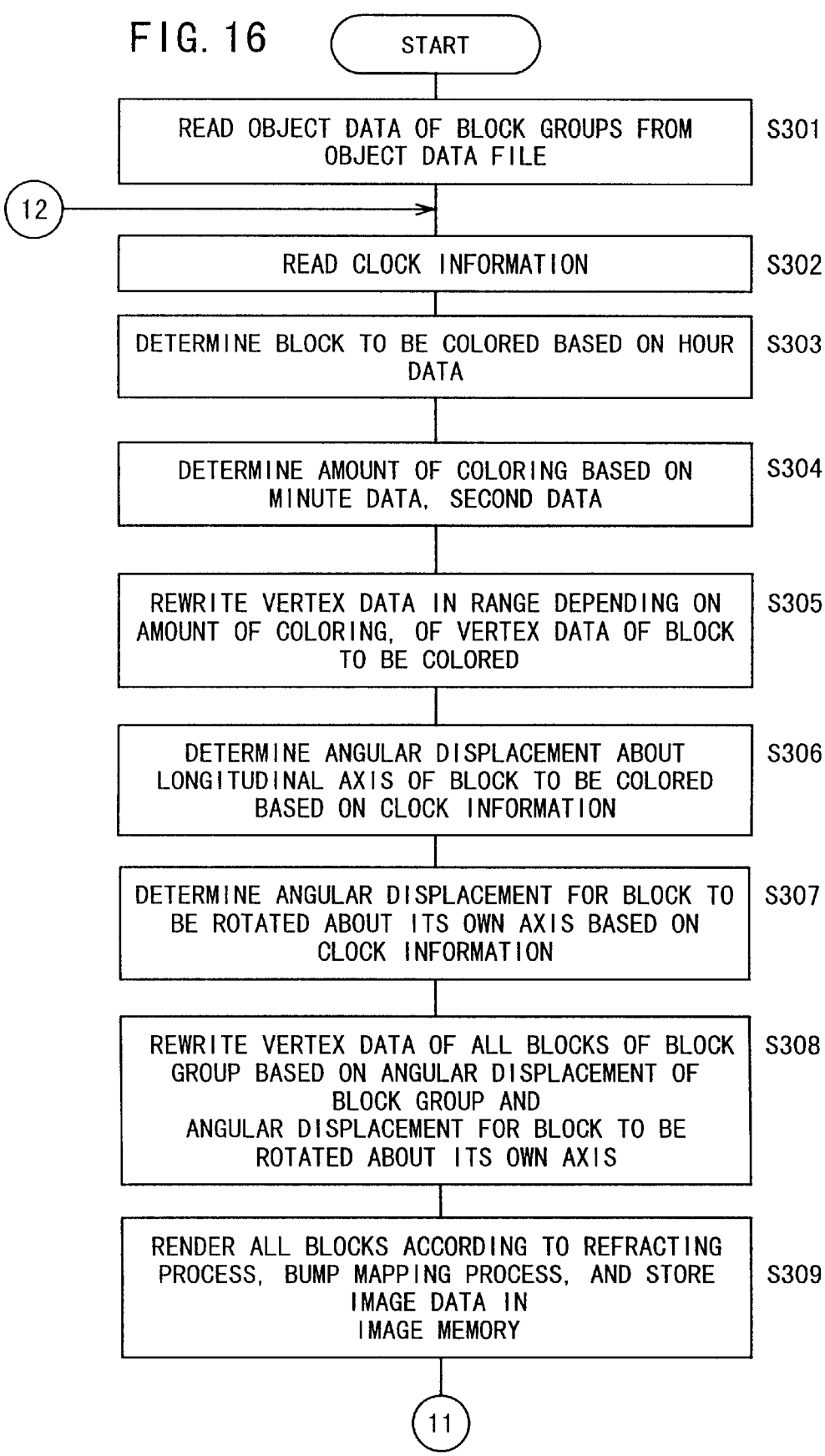
FIGS. 16 and 17 are a flowchart of a processing sequence of the measured quantity displaying means according to the second embodiment.

In step S301 shown in FIG. 16, the object data reading means 374 reads object data 370 of the block group 304 and the object data 372 of the light spot group 310 from the object data file 204.

In step S302, the clock information reading means 376 reads present clock information from the real-time clock 28.

In step S303, the coloring block determining means 378 determines a block 306a to be colored based on the time data of the clock information. In step S304, the amount-of-coloring determining means 380 determines an amount of coloring based on the minute data and second data of the clock information. In step S305, the first vertex data rewriting means 386 rewrites vertex data (color-related information) in a range depending on the amount of coloring, of the vertex data of the block 306a to be colored.

In step S306, the first angular displacement determining means 382 determines an angular displacement for the block group 304 to be rotated about the longitudinal axis of the block 306a based on the clock information. In step S307, the second angular displacement determining means 384 determines an angular displacement for each block 306 to be rotated about its own axis based on the clock information. In step S308, the first vertex data rewriting means 386 rewrites all vertex data (coordinate-related information) of the block group 304 based on the determined angular displacement of the entire block group 304 and the angular displacement of each block 306 about its own axis.

In step S309, the block group rendering means 388 renders three-dimensional images of all the blocks 306 of the block group 304 by performing a refracting process, a bump mapping process, etc., and stores the rendered three-dimensional images of the block group 304 in the image memory 74.

Figure 17:
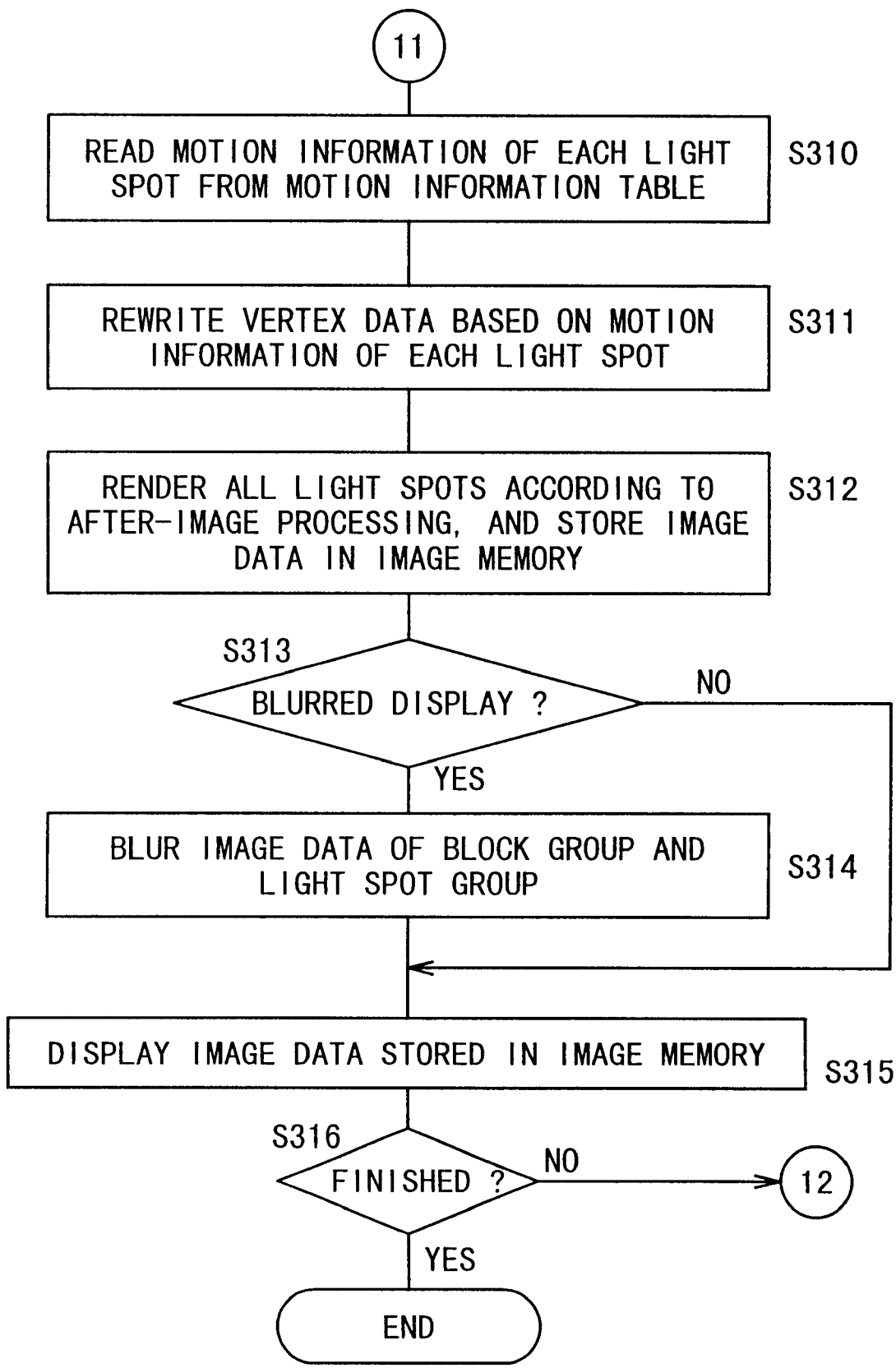

In step S310 shown in FIG. 17, the motion information reading means 392 reads motion information of each light spot 308 from the motion information table 390 which stores motion information of each light spot 308. In step S311, the second vertex data rewriting means 394 rewrites vertex data of the object data 372 based on the motion information of each light spot 308.

In step S312, the light spot group rendering means 396 renders three-dimensional images of the light spots 308 of the light spot group 310 according to the after-image processing and stores the rendered three-dimensional images of the light spot group 310 in the image memory 74.

In step S313, the blurring processing means 398 decides whether the block group 304 and the light spot group 310 are to be blurred in display based on the information as to blurring display from the blurring setting/canceling means 334.

If the block group 304 and the light spot group 310 are to be blurred in display, then control proceeds to step S314 in which the blurring processing means 398 performs a blurring process on the rendered image data of the block group 304 and the light spot group 310 according to a pixel displacing process, a semitransparency process, etc.

After the processing in step S314, or if the block group 304 and the light spot group 310 are not to be blurred in display in step S313, then control goes to step S315 in which the image data outputting means 400 outputs the image data of at least the block group 304 and the light spot group 310 stored in the image memory 74 to the display monitor 18, which displays three-dimensional images of at least the block group 304 and the light spot group 310. If the display of a menu image is required at this time, then a menu image is also displayed.

In step S316, the end determining means 402 decides whether there is an end request for finishing the processing sequence of the measured quantity displaying means 328 or not. If there is no end request, then control goes back to step S302 to repeat the processing sequence from step S302.

If there is an end request in step S316, then the above processing sequence of the measured quantity displaying means 328 is ended.

As described above, the parameter setting changing means 300 simultaneously displays a menu image for changing settings of various parameters used by the entertainment apparatus 10 and a model image, i.e., an image of the block group 304 and the light spot group 310 in combination, representing attributes of parameters whose settings are to be changed, and changes the model image based on parameter settings that are changed in response to control inputs. When the user is to change settings of various parameters used by the entertainment apparatus 10, the user changes those parameter settings while viewing the menu image displayed on the display monitor 18, and the model image displayed behind the menu image is changed based on the changed parameter settings.

Usually, it has heretofore been the general practice to display an unattractive setting image of only items and numbers. According to the present invention, however, the model image representing parameter attributes is displayed behind the menu image, for example, and the model image changes depending on parameter values. At this time, the position of a block to be colored is changed or the amount of coloring thereon is changed, and the rotation of the block group is abruptly changed.

Therefore, the parameter setting changing means 300 allows the user to find it enjoyable to change parameter settings, and makes the user apt to be interested in the entertainment apparatus 10.

The measured quantity displaying means 328 according to the second embodiment expresses time with the single block group 304, while displaying the light spots 308 as they move around the sphere 312 radially inwardly of the block group 304. Therefore, the measured quantity displaying means 328 can display time in a highly impressive manner for improved customer attraction.

In the above illustrated embodiment, time information is expressed by the first and second block groups 110, 112 and the single block group 304. However, the present invention is also applicable to the expression of other pieces of information including calendar information, the length of an object, the weight of an object, and the speed of an object.

The parameter setting changing means 300 has been described as being used to change time settings. However, the parameter setting changing means 300 may be used to change the setting of playback track for CD-ROMs and DVD-ROMs, and the setting of an access block of a memory card.

As described above, the method of and the apparatus for displaying a measured physical quantity including time information, the recording medium, and the program according to the present invention are capable of displaying a measured physical quantity with digital and analog display elements for enjoyable display patterns.

The method of and the apparatus for displaying a measured physical quantity including time information, the recording medium, and the program according to the present invention allow the user to change parameter settings in an enjoyable manner for thereby making the user liable to be interested in computers.

Although certain preferred embodiments of the present invention have been shown and described in detail, it should be understood that various changes and modifications may be made therein without departing from the scope of the appended claims.

What is claimed is:

1. A method for displaying a physical quantity on a two-dimensional screen, comprising:
   displaying a group of objects on the two-dimensional screen in an array defined by a predetermined rule;
   obtaining a measurement of the physical quantity; coloring at least one of the objects of the group as a function of the measurement;
   adjusting a position of the at least one object with respect to the other objects of the group as a function of the measurement; and
   using three-dimensional perspective according to a predetermined rule in order to rotate the other objects of the group about the at least one object.

2. A method according to claim 1, wherein the objects are polygonal shapes.

3. A method according to claim 2, wherein the at least one object defines a central axis and the other objects of the group are rotated about the central axis of the at least one object.

4. A method according to claim 1, further comprising maintaining a position of the at least one object fixed.

5. A method according to claim 1, further comprising:
   displaying a plurality of groups of objects on the two-dimensional screen in respective arrays defined by respective predetermined rules; and
   positioning one of the groups of blocks with respect to the other groups of blocks as a function of the measurement.

6. A method according to claim 1, wherein the physical quantity represents calendar information.

7. A method according to claim 1, wherein the physical quantity represents clock information.

8. A method according to claim 7, further comprising:
   dividing the physical quantity into at least first and second scales;
   displaying a first group of objects in a first circular array having a first diameter;
   displaying a second group of objects in a second circular array, concentric with the first circular array, having a second diameter;
   defining the first group of objects as one hand of a clock and the second group of objects as another hand of a clock;
   selecting one of the objects of the first group, and coloring that object by an amount, in proportion to the measurement of the physical quantity in the first scale; and
   selecting one of the objects of the second group, and coloring that object by an amount, in proportion to the measurement of the physical quantity in the second scale.

9. A method according to claim 8, wherein the one hand represents hours, and the other hand represents minutes.

10. A method according to claim 9, wherein the amount of coloring on the minute hand represents a third scale of the physical quantity, seconds.

11. A method according to claim 7, further comprising:
    dividing the physical quantity into at least first and second scales;
    displaying the group of objects in a circular array;
    defining the first group of objects as a hand of a clock;
    selecting one of the objects of the group, and coloring that object by an amount, in proportion to the measurement of the physical quantity in the first scale.

12. A method according to claim 11, wherein the hand represents hours, and the color of the hand represents minutes.

13. A method for changing a parameter for use in a computer, comprising:
    displaying a group of objects on a two-dimensional screen in an array defined by a predetermined rule;
    obtaining an indication representing any change in the parameter;
    coloring at least one of the objects of the group as a function of the change in the parameter;
    adjusting a position of the at least one object with respect to the other objects of the group as a function of the change in the parameter; and
    using three-dimensional perspective according to a predetermined rule in order to rotate the other objects of the group about the at least one object.

14. An apparatus for displaying a physical quantity on a two-dimensional screen, comprising:
   means for displaying a group of objects on the two-dimensional screen in an array defined by a predetermined rule;
   means for obtaining a measurement of the physical quantity;
   means for coloring at least one of the objects of the group as a function of the measurement;
   means for adjusting a position of the at least one object with respect to the other objects of the group as a function of the measurement; and
   means using three-dimensional perspective according to a predetermined rule in order to rotate the other objects of the group about the at least one object using three-dimensional perspective.

15. An apparatus according to claim 14, wherein the objects are polygonal shapes.

16. An apparatus according to claim 14, wherein the at least one object defines a central axis and the other objects of the group rotate about the central axis of the at least one object.

17. An apparatus according to claim 14, wherein a position of the at least one object is fixed.

18. An apparatus according to claim 14, wherein:
   the means for displaying is operable to display a plurality of groups of objects on the two-dimensional screen in respective arrays defined by respective predetermined rules; and
   the means for moving is operable to position one of the groups of blocks with respect to the other groups of blocks as a function of the measurement.

19. An apparatus according to claim 14, wherein the physical quantity represents calendar information.

20. An apparatus according to claim 14, wherein the physical quantity represents clock information.

21. An apparatus according to claim 20, further comprising:
   means for dividing the physical quantity into at least first and second scales;
   means for displaying a first group of objects in a first circular array having a first diameter;
   means for displaying a second group of objects in a second circular array, concentric with the first circular array, having a second diameter;
   means for defining the first group of objects as one hand of a clock and the second group of objects as another hand of a clock; and
   means for (i) selecting one of the objects of the first group, and coloring that object by an amount, in proportion to the measurement of the physical quantity in the first scale, and (ii) selecting one of the objects of the second group, and coloring that object by an amount, in proportion to the measurement of the physical quantity in the second scale.

22. An apparatus according to claim 21, wherein the one hand represents hours, and the other hand represents minutes.

23. An apparatus according to claim 22, wherein the amount of coloring on the minute hand represents a third scale of the physical quantity, seconds.

24. An apparatus according to claim 20, further comprising:
   means for dividing the physical quantity into at least first and second scales;
   means for displaying the group of objects in a circular array;
   means for defining the first group of objects as a hand of a clock;
   means for selecting one of the objects of the group, and coloring that object by an amount, in proportion to the measurement of the physical quantity in the first scale.

25. An apparatus according to claim 24, wherein the hand represents hours, and the color of the hand represents minutes.

26. A processor operating under the control of a program, the program causing the processor to execute actions for displaying a physical quantity on a two-dimensional screen, the actions comprising:
   displaying a group of objects on the two-dimensional screen in an array defined by a predetermined rule;
   obtaining a measurement of the physical quantity;
   coloring at least one of the objects of the group as a function of the measurement;
   adjusting a position of the at least one object with respect to the other objects of the group as a function of the measurement; and
   using three-dimensional perspective according to a predetermined rule in order to rotate the other objects of the group about the at least one object.

27. A recording medium containing a program for causing a processor to execute actions for displaying a physical quantity on a two-dimensional screen, the actions comprising:
   displaying a group of objects on the-two-dimensional screen in an array defined by a predetermined rule;
   obtaining a measurement of the physical quantity;
   coloring at least one of the objects of the group as a function of the measurement;
   adjusting a position of the at least one object with respect to the other objects of the group as a function of the measurement; and
   using three-dimensional perspective according to a predetermined rule in order to rotate the other objects of the group about the at least one object.

28. A recording medium according to claim 27, wherein the objects are polygonal shapes.

29. A recording medium according to claim 27, wherein the at least one object defines a central axis and the other objects of the group are rotated about the central axis of the at least one object.

30. A recording medium according to claim 27, further comprising maintaining a position of the at least one object fixed.

31. A recording medium according to claim 27, further comprising:
   displaying a plurality of groups of objects on the two-dimensional screen in respective arrays defined by respective predetermined rules; and
   positioning one of the groups of blocks with respect to the other groups of blocks as a function of the measurement.

32. A recording medium according to claim 27, wherein the physical quantity represents calendar information.

33. A recording medium according to claim 27, wherein the physical quantity represents clock information.

34. A recording medium according to claim 33, further comprising:
   dividing the physical quantity into at least first and second scales;

displaying a first group of objects in a first circular array having a first diameter;

displaying a second group of objects in a second circular array, concentric with the first circular array, having a second diameter;

defining the first group of objects as one hand of a clock and the second group of objects as another hand of a clock;

selecting one of the objects of the first group, and coloring that object by an amount, in proportion to the measurement of the physical quantity in the first scale; and selecting one of the objects of the second group, and coloring that object by an amount, in proportion to the measurement of the physical quantity in the second scale.

35. A recording medium according to claim 34, wherein the one hand represents hours, and the other hand represents minutes.

36. A recording medium according to claim 35, wherein the amount of coloring on the minute hand represents a third scale of the physical quantity, seconds.

37. A recording medium according to claim 33, further comprising:

dividing the physical quantity into at least first and second scales;

displaying the group of objects in a circular array;

defining the first group of objects as a hand of a clock;

selecting one of the objects of the group, and coloring that object by an amount, in proportion to the measurement of the physical quantity in the first scale.

38. A recording medium according to claim 37, wherein the hand represents hours, and the color of the hand represents minutes.

* * * * *

UNITED STATES PATENT AND TRADEMARK OFFICE
CERTIFICATE OF CORRECTION

PATENT NO. : 6,693,606 B1
APPLICATION NO. : 09/657037
DATED : February 17, 2004
INVENTOR(S) : Takamasa Shitisawa and Hajime Sugiyama It is certified that error appears in the above-identified patent and that said Letters Patent is hereby corrected as shown below:

Column 2, line 26, after "colored." begin new paragraph.
Column 10, line 36, delete "5".
Column 20, line 31, delete the hyphen between "the" and "two".

Signed and Sealed this

Twenty-first Day of November, 2006

JON W. DUDAS
*Director of the United States Patent and Trademark Office*